(12) United States Patent
Lee et al.

(10) Patent No.: US 11,997,053 B2
(45) Date of Patent: May 28, 2024

(54) HALF DUPLEX HANDLING IN CARRIER AGGREGATION

(71) Applicant: QUALCOMM Incorporated, San Diego, CA (US)

(72) Inventors: Heechoon Lee, San Diego, CA (US); Peter Gaal, San Diego, CA (US); Alexei Yurievitch Gorokhov, San Diego, CA (US); Joseph Binamira Soriaga, San Diego, CA (US); Amir Aminzadeh Gohari, Sunnyvale, CA (US); Tingfang Ji, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/691,434

(22) Filed: Nov. 21, 2019

(65) Prior Publication Data
US 2020/0169377 A1 May 28, 2020

Related U.S. Application Data

(60) Provisional application No. 62/771,566, filed on Nov. 26, 2018.

(51) Int. Cl.
*H04L 5/16* (2006.01)
*H04L 5/00* (2006.01)
*H04W 72/0446* (2023.01)

(52) U.S. Cl.
CPC .............. *H04L 5/16* (2013.01); *H04L 5/0051* (2013.01); *H04L 5/0055* (2013.01); *H04W 72/0446* (2013.01)

(58) Field of Classification Search
CPC ....... H04L 5/16; H04L 5/0051; H04L 5/0055; H04W 72/0446; H04W 56/002; H04W 56/0015

(Continued)

(56) References Cited

U.S. PATENT DOCUMENTS

2016/0270070 A1* 9/2016 Mukkavilli ............... H04L 5/14
2016/0270115 A1* 9/2016 Mukkavilli ........... H04W 72/23
(Continued)

FOREIGN PATENT DOCUMENTS

| CN | 107046719 A | 8/2017 |
| WO | WO-2016122845 A1 | 8/2016 |
| WO | WO-2018158924 A1 | 9/2018 |

OTHER PUBLICATIONS

NTT Docomo, Inc., "Offline Summary for AI 7.3.3.4 UL data transmission procedure", R1-1801080, Jan. 22-26, 2018 (From Applicant's IDS) (Year: 2018).*
(Continued)

*Primary Examiner* — Mang Hang Yeung
(74) *Attorney, Agent, or Firm* — QUALCOMM Incorporated

(57) ABSTRACT

Methods, systems, and devices for wireless communications are described. A user equipment (UE) may receive a first slot format configuration for a first serving cell for a set of transmission time intervals (TTIs) including a first TTI and receive a second slot format configuration for the first serving cell for the first TTI which is different from the first slot format configuration. The UE may determine, based on priorities of the slot format configurations, a first communication direction for the first serving cell for the first TTI. The UE may identify, for a second serving cell for the first TTI, a second communication direction indicated by one or more slot format configurations for the second serving cell. The UE may determine whether to communicate on the second serving cell for the first TTI according to the one or more slot format configurations for the second serving cell.

29 Claims, 10 Drawing Sheets

(58) Field of Classification Search
USPC .......................................................... 370/280
See application file for complete search history.

(56) References Cited

U.S. PATENT DOCUMENTS

| | | | | |
|---|---|---|---|---|
| 2019/0200305 A1* | 6/2019 | Kazmi | .................. | H04W 52/34 |
| 2019/0223181 A1* | 7/2019 | Sun | ........................ | H04W 72/10 |
| 2020/0015261 A1* | 1/2020 | Takeda | .............. | H04W 72/0446 |

OTHER PUBLICATIONS

International Search Report and Written Opinion—PCT/US2019/062828—ISA/EPO—dated Feb. 13, 2020.
NTT Docomo, et al., "Offline summary for AI 7.3.3.4 UL Data transmission procedure," 3GPP Draft, 3GPP TSG RAN WG1 NR Ad Hoc Meeting, R1-1801080, 3rd Generation Partnership Project (3GPP), Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, Jan. 24, 2018 (Jan. 24, 2018), XP051385306, 33 pages, Retrieved from the Internet:URL: http://www.3gpp.org/ftp/tsg%5Fran/WG1%5FRL1/TSGR1%5FAH/NR%5FAH%5F1801/Docs/ [retrieved on Jan. 24, 2018], p. 9-15.
Qualcomm Incorporated: "Remaining Issues on Slot Format Indication," 3GPP Draft, 3GPP TSG RAN WG1 NR AdHoc#3, R1-1716416_SFI_REMAINING,3rd Generation Partnership Project (3GPP), Mobile Competence Centre, 650, Route Des Lucioles, F-06921, Sophia-Antipolis Cedex, France, vol. RAN WG1, No. Nagoya, Japan; Sep. 18, 2017-Sep. 21, 2017, Sep. 17, 2017, XP051339871, 11 pages, Retrieved from the Internet: URL: http://www.3gpp.org/ftp/Meetings_3GPP_SYNC/RAN1/Docs/ [retrieved on Sep. 17, 2017] pp. 4-9.

* cited by examiner

HALF DUPLEX HANDLING IN CARRIER AGGREGATION

CROSS REFERENCE

The present application for patent claims the benefit of U.S. Provisional Patent Application No. 62/771,566 by Lee et al. entitled "HALF DUPLEX HANDLING IN CARRIER AGGREGATION," filed Nov. 26, 2018, assigned to the assignee hereof, and expressly incorporated by reference in its entirety herein.

BACKGROUND

The following relates generally to wireless communications, and more specifically to half duplex handling in carrier aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

In a carrier aggregation configuration, two or more component carriers may be aggregated for use by a single user equipment (UE). A UE configured for carrier aggregation may communicate on multiple serving cells, each providing one of the aggregated component carriers. For example, the UE may have a primary serving cell and one or more secondary serving cells. In some cases, the carrier aggregation configuration may be a dual connectivity configuration, where the primary serving cell (and optionally one or more secondary serving cells) is served by a first base station or transmission reception point (TRP), and one or more secondary serving cells (one of which may be a primary secondary serving cell) is served by a second base station or TRP. In some cases, the UE may be configured for half-duplex communications, where the UE may not support transmitting and receiving at the same time. In half-duplex communications, uplink transmissions may impact downlink reception at the UE, or downlink reception may impact uplink transmission, for example when at least a portion of the transmissions overlap or are scheduled to overlap in time.

A cell may configure slot scheduling by transmitting a slot format indicator (SFI), which may indicate the transmission direction of one or more transmission time intervals (TTIs). In some cases, a slot or a symbol, or a combination thereof, may be an example of a TTI. The cell may transmit a semi-static SFI, a Radio Resource Control (RRC)-configured SFI, a dynamic SFI, or any combination thereof to configure slots. The uplink and downlink symbol periods and slots configured by the semi-static SFI may not be reconfigured, but the flexible symbols and flexible slots may be reconfigured by an RRC-configured SFI, dynamic SFI, or received grant (e.g., received via downlink control information). Each cell of the carrier aggregation configuration may transmit a semi-static SFI, configure slot scheduling via RRC signaling, transmit dynamic scheduling, or any combination thereof. However, the SFIs transmitted by the multiple cells may indicate to the UE to transmit or receive in different directions at the same time. If the UE is configured to operate according to half-duplex communications, the UE may be unable to both transmit and receive at the same time as indicated by the multiple SFIs. Thus, the UE may implement techniques to determine whether to drop a transmission or whether to use the allocation to transmit or receive. The determination of whether to drop a transmission may be based on a type of one or more SFIs received from a reference cell, a type of one or more SFIs received from a secondary cell, the transmission direction for the reference cell, and the transmission direction for the secondary cell.

A method of wireless communication at a UE is described. The method may include receiving a first slot format configuration for a first serving cell for a set of TTIs that include a first TTI, receiving, following the first slot format configuration, a second slot format configuration for the first serving cell for at least the first TTI, the second slot format configuration for the first TTI being different from the first slot format configuration for the first TTI, determining, based on the second slot format configuration having a higher priority than the first slot format configuration, a first one or more communication directions for the first serving cell for the first TTI, identifying, for a second serving cell for the first TTI, a second one or more communication directions indicated by one or more slot format configurations for the second serving cell, and determining, based on whether the determined first one or more communication directions for the first serving cell is different from the identified second one or more communication directions for the second serving cell, and based on the one or more slot format configurations for the second serving cell, whether to communicate on the second serving cell for the first TTI according to the one or more slot format configurations for the second serving cell.

An apparatus for wireless communication at a UE is described. The apparatus may include a processor, memory in electronic communication with the processor, and instructions stored in the memory. The instructions may be executable by the processor to cause the apparatus to receive a first slot format configuration for a first serving cell for a set of TTIs that include a first TTI, receive, following the first slot format configuration, a second slot format configuration for the first serving cell for at least the first TTI, the second slot format configuration for the first TTI being different from the first slot format configuration for the first TTI, determine, based on the second slot format configuration having a higher priority than the first slot format configuration, a first one or more communication directions for the first serving cell for the first TTI, identify, for a second serving cell for the first TTI, a second one or more communication directions indicated by one or more slot format configurations for the second serving cell, and determine, based on whether the determined first one or more communication directions for the first serving cell is different from the identified second one or more communication directions for the second serving cell, and based on the one or more slot format configurations for the second serving cell, whether to communicate on the second serving cell for the first TTI according to the one or more slot format configurations for the second serving cell.

Another apparatus for wireless communication at a UE is described. The apparatus may include means for receiving a first slot format configuration for a first serving cell for a set of TTIs that include a first TTI, receiving, following the first slot format configuration, a second slot format configuration for the first serving cell for at least the first TTI, the second slot format configuration for the first TTI being different from the first slot format configuration for the first TTI, determining, based on the second slot format configuration having a higher priority than the first slot format configuration, a first one or more communication directions for the first serving cell for the first TTI, identifying, for a second serving cell for the first TTI, a second one or more communication directions indicated by one or more slot format configurations for the second serving cell, and determining, based on whether the determined first one or more communication directions for the first serving cell is different from the identified second one or more communication directions for the second serving cell, and based on the one or more slot format configurations for the second serving cell, whether to communicate on the second serving cell for the first TTI according to the one or more slot format configurations for the second serving cell.

A non-transitory computer-readable medium storing code for wireless communication at a UE is described. The code may include instructions executable by a processor to receive a first slot format configuration for a first serving cell for a set of TTIs that include a first TTI, receive, following the first slot format configuration, a second slot format configuration for the first serving cell for at least the first TTI, the second slot format configuration for the first TTI being different from the first slot format configuration for the first TTI, determine, based on the second slot format configuration having a higher priority than the first slot format configuration, a first one or more communication directions for the first serving cell for the first TTI, identify, for a second serving cell for the first TTI, a second one or more communication directions indicated by one or more slot format configurations for the second serving cell, and determine, based on whether the determined first one or more communication directions for the first serving cell is different from the identified second one or more communication directions for the second serving cell, and based on the one or more slot format configurations for the second serving cell, whether to communicate on the second serving cell for the first TTI according to the one or more slot format configurations for the second serving cell.

In some examples of the method, apparatuses, and non-transitory computer-readable medium described herein, identifying the second one or more communication directions indicated by the one or more slot format configurations for the second serving cell may include operations, features, means, or instructions for receiving a third slot format configuration for the second serving cell for a set of TTIs that include the first TTI, receiving a fourth slot format configuration for the second serving cell for at least the first TTI, the fourth slot format configuration for the first TTI being different from the third slot format configuration for the first TTI, and identifying, based on the fourth slot format configuration having a higher priority than the third slot format configuration, a second one or more communication directions for the second serving cell for the first TTI.

In some examples of the method, apparatuses, and non-transitory computer-readable medium described herein, determining the first one or more communication directions may include operations, features, means, or instructions for determining that the first TTI may be downlink based on the received first slot format configuration and the received second slot format configuration, where the received first slot format configuration for the first serving cell includes RRC signaling, and the second slot format configuration for the first serving cell includes DCI or a dynamic SFI identifying the first TTI as downlink, the method further including, and determining to drop an uplink communication on the second serving cell based on identifying the first TTI as downlink.

In some examples of the method, apparatuses, and non-transitory computer-readable medium described herein, determining the first one or more communication directions may include operations, features, means, or instructions for determining that the first TTI may be uplink based on the received first slot format configuration and the received second slot format configuration, where the received first slot format configuration for the first serving cell includes RRC signaling, and the second slot format configuration for the first serving cell includes DCI or a dynamic SFI identifying the first TTI as uplink, the method further including, and determining to drop a downlink communication on the second serving cell based on identifying the first TTI as uplink.

In some examples of the method, apparatuses, and non-transitory computer-readable medium described herein, determining whether to communicate on the second serving cell for the first TTI may include operations, features, means, or instructions for determining to communicate on the first serving cell according to the first one or more communication directions and on the second serving cell according to the second one or more communication directions based on the first one or more communication directions and the second one or more communication directions includes a same communication direction.

In some examples of the method, apparatuses, and non-transitory computer-readable medium described herein, determining whether to communicate on the second serving cell for the first TTI may include operations, features, means, or instructions for determining to drop communications on the second serving cell based on the second one or more communication directions being different from the first one or more communication directions, the received first slot format configuration including an RRC signaling, and the second slot format configuration including DCI or a dynamic SFI.

In some examples of the method, apparatuses, and non-transitory computer-readable medium described herein, determining whether to communicate on the second serving cell for the first TTI may include operations, features, means, or instructions for determining to drop communications on the first serving cell based on the second one or more communication directions being different from the first one or more communication directions, the received first slot format configuration including an RRC signaling, and the second slot format configuration including DCI or a dynamic SFI.

In some examples of the method, apparatuses, and non-transitory computer-readable medium described herein, the first serving cell and the second serving cell may be within a same radio frequency spectrum band.

In some examples of the method, apparatuses, and non-transitory computer-readable medium described herein, the first serving cell may be within a first radio frequency spectrum band and the second serving cell may be within a second radio frequency spectrum band.

In some examples of the method, apparatuses, and non-transitory computer-readable medium described herein, the second serving cell includes one of a set of serving cells.

In some examples of the method, apparatuses, and non-transitory computer-readable medium described herein, the first serving cell includes a reference serving cell, and the second service cell includes an other serving cell.

In some examples of the method, apparatuses, and non-transitory computer-readable medium described herein, the reference serving cell includes a primary cell of a carrier aggregation configuration, and the other serving cell includes a secondary cell of the carrier aggregation configuration.

In some examples of the method, apparatuses, and non-transitory computer-readable medium described herein, the reference serving cell includes a first secondary cell of a carrier aggregation configuration, and the other serving cell includes a second secondary cell of the carrier aggregation configuration.

A method of wireless communication at a UE is described. The method may include receiving a first slot format configuration for a first serving cell for a set of TTIs that includes a first TTI, the first slot format configuration indicating a first one or more communication directions for the first TTI, receiving a second slot format configuration for a second serving cell for at least the first TTI, the second slot format configuration indicating a second one or more communication directions for the first TTI on the second serving cell, determining, for the first TTI, that the first one or more communication directions for the first serving cell is different from the second one or more communication directions for the second serving cell, and determining to communicate on the first serving cell in the first one or more communication directions for the first TTI or on the second serving cell in the second one or more communication directions for the first TTI based on determining that the first one or more communication directions is different from the second one or more communication directions, the first slot format configuration for the first serving cell, and the second slot format configuration for the second serving cell.

An apparatus for wireless communication at a UE is described. The apparatus may include a processor, memory coupled with the processor, and instructions stored in the memory. The instructions may be executable by the processor to cause the apparatus to receive a first slot format configuration for a first serving cell for a set of TTIs that includes a first TTI, the first slot format configuration indicating a first one or more communication directions for the first TTI, receive a second slot format configuration for a second serving cell for at least the first TTI, the second slot format configuration indicating a second one or more communication directions for the first TTI on the second serving cell, determine, for the first TTI, that the first one or more communication directions for the first serving cell is different from the second one or more communication directions for the second serving cell, and determine to communicate on the first serving cell in the first one or more communication directions for the first TTI or on the second serving cell in the second one or more communication directions for the first TTI based on determining that the first one or more communication directions is different from the second one or more communication directions, the first slot format configuration for the first serving cell, and the second slot format configuration for the second serving cell.

Another apparatus for wireless communication at a UE is described. The apparatus may include means for receiving a first slot format configuration for a first serving cell for a set of TTIs that includes a first TTI, the first slot format configuration indicating a first one or more communication directions for the first TTI, receiving a second slot format configuration for a second serving cell for at least the first TTI, the second slot format configuration indicating a second one or more communication directions for the first TTI on the second serving cell, determining, for the first TTI, that the first one or more communication directions for the first serving cell is different from the second one or more communication directions for the second serving cell, and determining to communicate on the first serving cell in the first one or more communication directions for the first TTI or on the second serving cell in the second one or more communication directions for the first TTI based on determining that the first one or more communication directions is different from the second one or more communication directions, the first slot format configuration for the first serving cell, and the second slot format configuration for the second serving cell.

A non-transitory computer-readable medium storing code for wireless communication at a UE is described. The code may include instructions executable by a processor to receive a first slot format configuration for a first serving cell for a set of TTIs that includes a first TTI, the first slot format configuration indicating a first one or more communication directions for the first TTI, receive a second slot format configuration for a second serving cell for at least the first TTI, the second slot format configuration indicating a second one or more communication directions for the first TTI on the second serving cell, determine, for the first TTI, that the first one or more communication directions for the first serving cell is different from the second one or more communication directions for the second serving cell, and determine to communicate on the first serving cell in the first one or more communication directions for the first TTI or on the second serving cell in the second one or more communication directions for the first TTI based on determining that the first one or more communication directions is different from the second one or more communication directions, the first slot format configuration for the first serving cell, and the second slot format configuration for the second serving cell.

Some examples of the method, apparatuses, and non-transitory computer-readable medium described herein may further include operations, features, means, or instructions for receiving, following the first slot format configuration, a third slot format configuration for the first serving cell for at least the first TTI, the third slot format configuration for the first TTI indicating a third communication direction that is different from the first one or more communication directions for the first TTI, and determining to compare the first one or more communication directions for the first serving cell to the second one or more communication directions for the second serving based on the first slot format configuration having a higher priority than the first slot format configuration.

In some examples of the method, apparatuses, and non-transitory computer-readable medium described herein, determining to communicate on the first serving cell or the second serving cell further may include operations, features, means, or instructions for determining, based on the first slot format configuration being a semi-static slot format indicator and the second slot format configuration including a second semi-static slot format indicator, to communicate on the first serving cell for the first TTI and to drop communications on the second serving cell for the first TTI.

Some examples of the method, apparatuses, and non-transitory computer-readable medium described herein may further include operations, features, means, or instructions for dropping the communications on the second serving cell may be further based on the first serving cell being in a different radio frequency spectrum band than the second serving cell.

In some examples of the method, apparatuses, and non-transitory computer-readable medium described herein, determining to communicate on the first serving cell or the second serving cell may include operations, features, means, or instructions for determining, based on the first slot format configuration indicated by a semi-static slot format indicator of a first RRC signaling and the second slot format configuration indicated by a second RRC signal, to communicate on the first serving cell for the first TTI and to drop communications on the second serving cell for the first TTT.

In some examples of the method, apparatuses, and non-transitory computer-readable medium described herein, determining to communicate on the first serving cell or the second serving cell may include operations, features, means, or instructions for determining, based on the first slot format configuration being a semi-static slot format indication, the second slot format configuration including a dynamic slot format indication, the first one or more communication directions being downlink, and the second one or more communication directions being uplink, to communicate on the first serving cell for the first TTI and to drop communications on the second serving cell for the first TTI.

Some examples of the method, apparatuses, and non-transitory computer-readable medium described herein may further include operations, features, means, or instructions for dropping the communications on the second serving cell may be further based on the first serving cell being in a different radio frequency spectrum band than the second serving cell.

In some examples of the method, apparatuses, and non-transitory computer-readable medium described herein, determining to communicate on the first serving cell or the second serving cell may include operations, features, means, or instructions for determining, based on the first slot format configuration being received in first RRC signaling and the second slot format configuration being received in second RRC signaling, to communicate on the first serving cell for the first TTI and drop communications on the second serving cell for the first TTI.

In some examples of the method, apparatuses, and non-transitory computer-readable medium described herein, determining to communicate on the first serving cell or the second serving cell may include operations, features, means, or instructions for determining, based on the first slot format configuration being received in RRC signaling and the second slot format configuration including a semi-static slot format indicator, to communicate on the first serving cell for the first TTI and to drop communications on the second serving cell for the first TTI.

In some examples of the method, apparatuses, and non-transitory computer-readable medium described herein, determining to communicate on the first serving cell or the second serving cell may include operations, features, means, or instructions for determining, based on the first slot format configuration being received in RRC signaling and the second slot format configuration including a dynamic slot format indicator, to communicate on the first serving cell for the first TTI and to drop communications on the second serving cell for the second TTI.

Some examples of the method, apparatuses, and non-transitory computer-readable medium described herein may further include operations, features, means, or instructions for dropping the communications on the second serving cell may be further based on the first serving cell being in a different radio frequency spectrum band than the second serving cell.

In some examples of the method, apparatuses, and non-transitory computer-readable medium described herein, the first serving cell and the second serving cell may be within a same radio frequency spectrum band.

In some examples of the method, apparatuses, and non-transitory computer-readable medium described herein, the first serving cell may be within a first radio frequency spectrum band and the second serving cell may be within a second radio frequency spectrum band.

In some examples of the method, apparatuses, and non-transitory computer-readable medium described herein, the second serving cell includes one of a set of serving cells.

In some examples of the method, apparatuses, and non-transitory computer-readable medium described herein, the first serving cell includes a reference serving cell, and the second service cell includes an other serving cell.

In some examples of the method, apparatuses, and non-transitory computer-readable medium described herein, the reference serving cell includes a primary cell of a carrier aggregation configuration, and the other serving cell includes a secondary cell of the carrier aggregation configuration.

In some examples of the method, apparatuses, and non-transitory computer-readable medium described herein, the reference serving cell includes a first secondary cell of a carrier aggregation configuration, and the other serving cell includes a second secondary cell of the carrier aggregation configuration.

DETAILED DESCRIPTION

Figure 1:
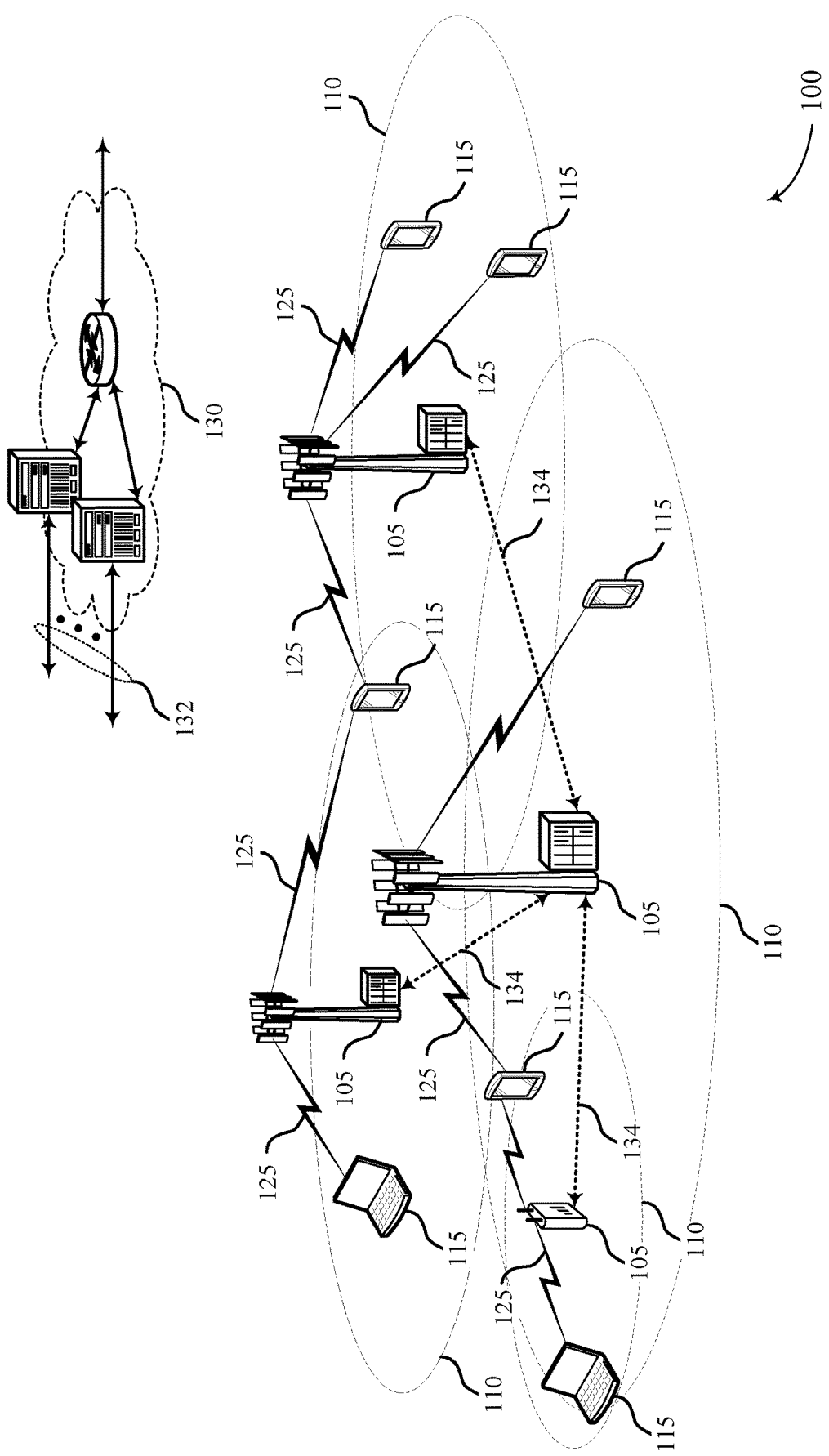
FIG. 1 illustrates an example of a wireless communications system that supports half duplex handling in carrier aggregation in accordance with aspects of the present disclosure.

A user equipment (UE) may be configured to communicate on two or more component carrier (cells) in a carrier aggregation configuration. In some cases, the UE may be configured to transmit or receive at the same time on different component carriers but lack the capability for full duplex transmission. Techniques to better resolve communication direction (transmit or receive) collisions are desired.

In a carrier aggregation configuration, two or more component carriers may be aggregated for use by a single UE. A UE configured for carrier aggregation may communicate on multiple serving cells, each providing one of the aggregated component carriers. For example, the UE may have a primary serving cell and one or more secondary serving cells. In some cases, the carrier aggregation configuration may be a dual connectivity configuration, where the primary serving cell (and optionally one or more secondary serving cells) is served by a first base station or transmission reception point (TRP), and one or more secondary serving cells (one of which may be a primary second serving cell) is served by a second base station. The UE may be configured with intra-band contiguous component carriers, intra-band non-contiguous component carriers, or inter-band non-contiguous component carriers. The multiple serving cells may schedule the UE based on capabilities for the UE. In some cases, the UE may be configured for full-duplex communications, where the UE can transmit and receive at the same time. However, if the UE is configured for half-duplex communications, for example because the UE is not capable of full-duplex communications, then the UE may not support transmitting and receiving at the same time. In half-duplex communications, uplink transmissions may impact downlink reception at the UE, or downlink reception may impact uplink transmission, for example when at least a portion of the transmissions overlap or are scheduled to overlap in time.

A cell may configure slot scheduling by transmitting a slot format indicator (SFI), which may indicate the transmission direction of one or more transmission time intervals (TTIs). In some cases, a slot or a symbol, or a combination thereof, may be an example of a TTI. The SFI may include an index which corresponds to a table with different configurations for the one or more slots. Each of the configurations may indicate which symbols of the one or more slots are configured for uplink, downlink, or flexible (e.g., can be uplink or downlink). The cell may transmit a semi-static SFI, a RRC-configured SFI, a dynamic SFI, or any combination thereof to configure slots. A semi-static SFI may indicate a number of downlink slots, downlink symbol periods, flexible symbols, uplink symbols, and uplink slots for the cell. The uplink and downlink symbol periods and slots configured by the semi-static SFI may not be reconfigured, but the flexible symbols and flexible slots may be reconfigured by an RRC-configured SFI, dynamic SFI, or received grant (e.g., received via downlink control information). Generally, dynamic scheduling (e.g., via a dynamic SFI or grant) may take priority over RRC-configured scheduling (e.g., via an RRC-configured SFI) for the cell.

Each cell of the carrier aggregation configuration may transmit a semi-static SFI, configure slot scheduling via RRC signaling, transmit dynamic scheduling, or any combination thereof. However, the SFIs transmitted by the multiple cells may indicate to the UE to transmit or receive in different directions at the same time. If the UE is configured to operate according to half-duplex communications, the UE may be unable to both transmit and receive at the same time as indicated by the multiple SFIs. Thus, the UE may implement techniques to determine whether to drop a transmission or whether to use the allocation to transmit or receive. The determination of whether to drop a transmission may be based on a type of one or more SFIs received from a reference cell and a type of one or more SFIs received from a secondary cell.

In an example, a reference cell or a secondary cell, or both, may transmit a semi-static SFI to configure a set of flexible TTIs, including a first TTI. The reference cell may transmit an RRC-configured SFI to assign the first TTI to a first direction for the reference cell. The UE may also receive one or more SFIs from the secondary cell which configure the first TTI for the secondary cell. In some cases, the configuration for the secondary cell may contradict, or assign the first TTI in an opposite direction from, the configuration for the reference cell. Thus, the UE may seem to have a conflicting (e.g., different) assignment for the first TTI. In some cases, the UE may give priority to the RRC-configured SFI of the reference cell over dynamic and RRC-configured SFIs received from other cells. The UE may drop the assignments for the other cells if they contradict the configuration for the reference cell. However, the reference cell may transmit a dynamic SFI to re-assign the first TTI. In these cases, the UE may consider how the dynamic SFI from the reference cell modifies the assignment of the first TTI, as the dynamic SFI may re-assign the direction configured by the RRC-configured SFI such that the SFI received from the secondary cell is not contradicting. The UE may perform directional resolution for the reference cell, then determine whether to drop an assignment and which assignment to drop based on the direction resolution.

Aspects of the disclosure are initially described in the context of a wireless communications system. Aspects of the disclosure are further illustrated by and described with reference to apparatus diagrams, system diagrams, and flowcharts that relate to half duplex handling in carrier aggregation.

FIG. 1 illustrates an example of a wireless communications system 100 that supports half duplex handling in carrier aggregation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource block (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 described herein may implement techniques for half duplex handling in carrier aggregation. For example, the UE 115 may multiple overlapping slot format configurations for a first cell of a carrier aggregation configuration. The UE 115 may determine a communication direction for the first cell based on a set of rules for in-carrier direction handling. The UE 115 may then identify a communication direction for a second cell of the carrier aggregation configuration based on a slot format configuration for the second cell and determine, based on the communication direction of the first cell and the slot format configurations, whether to transmit on the second cell.

Figure 2:
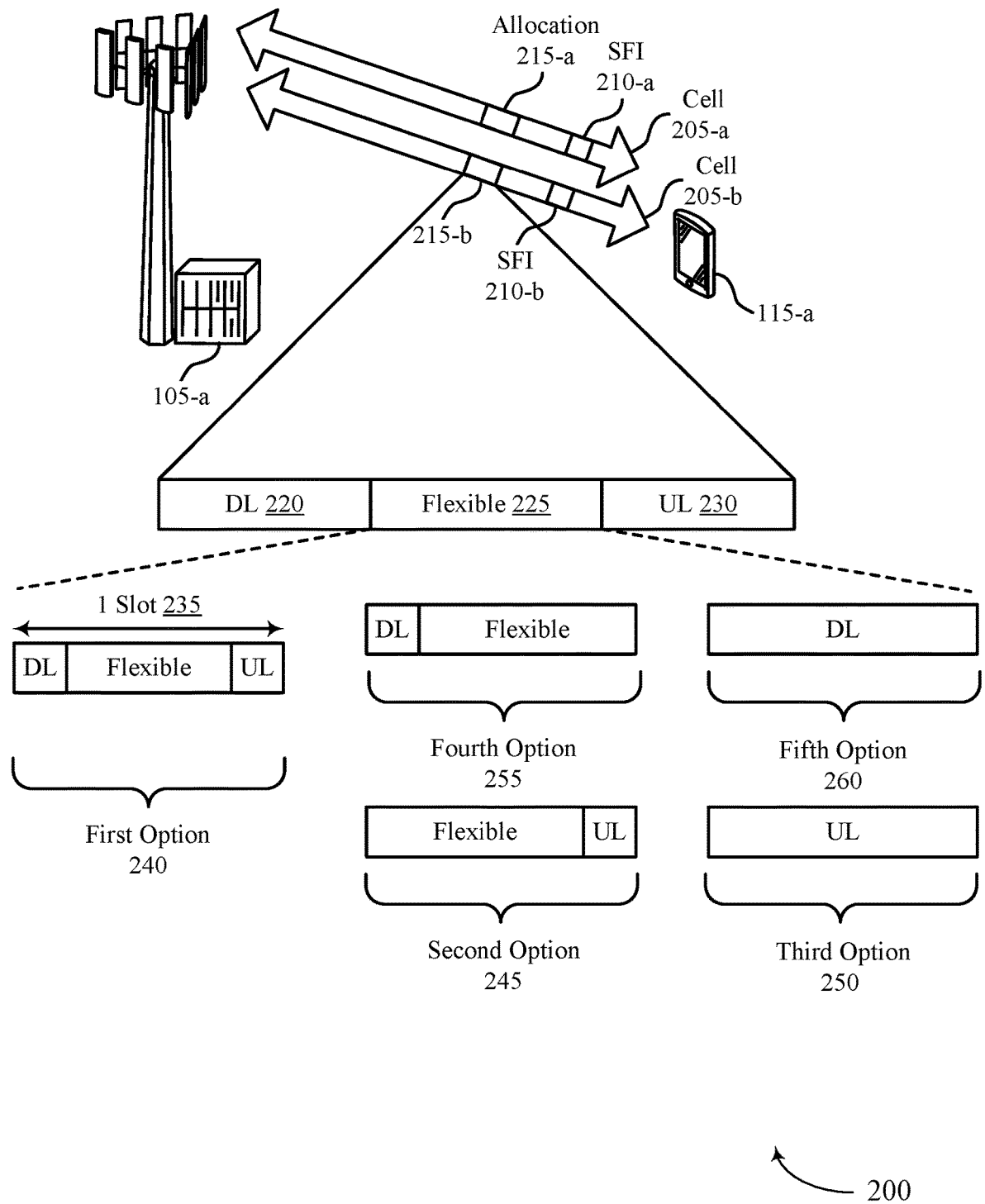
FIG. 2 illustrates an example of a wireless communications system that supports half duplex handling in carrier aggregation in accordance with aspects of the present disclosure.

FIG. 2 illustrates an example of a wireless communications system 200 that supports half duplex handling in carrier aggregation in accordance with aspects of the present disclosure. In some examples, the wireless communications system 200 may implement aspects of wireless communications system 100. Wireless communications system 200 may include a base station 105 which may be an example of a TRP.

UE 115-a may be configured for carrier aggregation with one or more cells 205. For example, base station 105-a may provide cell 205-a and cell 205-b to UE 115-a. Cell 205-a may provide a first component carrier, and cell 205-*b* may provide a second component carrier. Other cells 205 may provide other components carriers not shown. In some cases, the cells 205 may be provided by different base stations 105.

UE 115-*a* and may communicate on the cells 205 using TDD communications. In some cases, the carrier aggregation configuration may support intra-band contiguous TDD communications, where cell 205-*a* and cell 205-*b* are contiguous in a same radio frequency spectrum band. In some examples, the carrier aggregation configuration may support intra-band non-contiguous or adjacent band common passband TDD communications, where cell 205-*a* and cell 205-*b* are in a same radio frequency spectrum band but separated by a pass-band or one or more other component carriers. In some cases, the carrier aggregation configuration may support inter-band TDD, where the component carrier of cell 205-*a* is in a first radio frequency spectrum band and the component carrier of cell 205-*b* is in a second, different radio frequency spectrum band.

Some UEs 115 may be configured for full-duplex communications, where a UE 115 can transmit and receive at the same time. However, if the UE 115 is configured for half-duplex communications, then the UE 115 may not support transmitting and receiving at the same time. In half-duplex communications, uplink transmissions may impact downlink reception at the UE, or downlink reception may impact uplink transmission. UE 115-*a* may be configured to communicate according to half-duplex communications. In some cases, UE 115-*a* may not be capable of full-duplex communications. Or, in some other examples, UE 115-*a* may be capable of communicating using full-duplex communications, but UE 115-*a* may be restricted to use or configured to use a half-duplex configuration.

The duplex configuration at UE 115-*a* may be based on a configuration for the carrier aggregation. In a first example, if UE 115-*a* is configured for intra-band contiguous TDD, UE 115-*a* may use a common low noise amplifier (LNA) and a common power amplifier (PA) for cell 205-*a* and cell 205-*b*. UE 115-*a* may then employ a half-duplex configuration for intra-band contiguous TDD communications for the first example, which UE 115-*a* may arbitrate, such that UE 115-*a* only transmits or receives at a given time. In a second example, if UE 115-*a* is configured for intra-band non-contiguous or adjacent band common pass-band communications, UE 115-*a* may use a separate LNA and separate PA for cell 205-*a* and cell 205-*b*, but there may be little isolation between the LNAs and PAs. Therefore, UE 115-*a* may transmit and receive at the same time for the second example, but full-duplex communications may damage the sensor and receptors at UE 115-*a*. In a third example, UE 115-*a* may use a separate LNA, a separate PA, and a separate filter for cell 205-*a* and cell 205-*b*, which may provide some isolation. In the third example, UE 115-*a* may transmit and receive at the same time but may result in some desensitizing for these components.

In some cases, the duplex configuration at base station 105-*a* may be based on the carrier aggregation configuration as well. For example, if the carrier aggregation configuration supports inter-band TDD, base station 105-*a* may support full-duplex communications. However, if the carrier aggregation configuration supports intra-band contiguous TDD or intra-band non-contiguous TDD, base station 105-*a* may be limited to half-duplex communications.

A cell 205 may configure component carrier scheduling by transmitting an SFI, which may indicate the transmission direction of one or more TTIs. For example, cell 205-*a* may transmit SFI 210-*a*, which schedules a transmission on allocation 215-*a*. The allocation 215-*a* may include one or more TTIs, where a slot or a symbol, or a combination thereof, may be an example of a TTI. The SFI 210-*a* may include an index which corresponds to a table with different configurations for the one or more slots. Each of the configurations may indicate which TTIs of the allocation 215-*a* are configured for uplink, downlink, or flexible (e.g., can be uplink or downlink).

Cell 205-*a* may schedule transmission on the allocation 215-*a* by transmitting a semi-static SFI, configuring allocation 215-*a* via RRC configuration, transmitting a dynamic SFI, or any combination thereof. In some cases, the dynamic indication (e.g., the dynamic SFI) may be a grant that dynamically indicates a transmission direction. In some cases, UE 115-*a* may optionally (e.g., based on configuration) monitor for a group common PDCCH (GC-PDCCH) which conveys the dynamic SFI or grant dynamically indicating the transmission direction. The direction indicated in the dynamic SFI may be based on a direction derived from a grant, such as a downlink grant or an uplink grant.

A semi-static SFI pattern may indicate a number of downlink slots, downlink symbol periods, flexible symbols, uplink symbols, and uplink slots for the cell. The semi-static SFI pattern may be conveyed via a cell-specific RRC configuration or via a UE-specific RRC configuration.

Uplink and downlink TTIs configured by the semi-static SFI pattern may not be reconfigurable. Indicated synchronization signal blocks (SSBs) and Type® search space symbols may be considered as downlink TTIs. Physical random access channel (PRACH) occasions may be considered as uplink TTIs. There may not be directional conflict allowed between semi-static SFI configurations. However, flexible symbol periods may be reconfigured by dynamic SFI transmitted on a control channel. In some cases, DCI signaling may take priority (e.g., with an N2 timeline restriction) over RRC signaling for assigning flexible TTIs. In some cases, multi-slot physical downlink shared channel (PDSCH) or multi-slot physical uplink shared channel (PUSCH) may be cancelled on a per-slot basis if there is a direction conflict. In some cases, combinations of different subcarrier spacing (SCS) for different bandwidth parts may share a common semi-static SFI configuration.

Cell 205-*b* may also transmit an SFI 210 (e.g., SFI 210-*b*) which schedules a transmission on an allocation 215 (e.g., allocation 215-*b*). In some cases, allocation 215-*b* may overlap with allocation 215-*a*. As described herein, allocation 215-*b* may be configured to have a downlink portion 220, a flexible portion 225, and an uplink portion 230. The downlink portion 220 may include one or more downlink TTIs, and the uplink portion 230 may include one or more uplink TTIs. The downlink portion 220, the flexible portion 225, and the uplink portion 230 of allocation 215-*b* may be based on a concatenated pattern determined by Common/Common2 signaling.

The flexible portion 225 may be configured by a dynamic SFI to include uplink TTIs, downlink TTIs, or flexible TTIs, or any combination thereof. For example, a semi-static SFI or an RRC configuration may assign the flexible portion 225 as flexible in an initial configuration. Then, a dynamic SFI (e.g., based on a grant dynamically indicating a direction) may reconfigure one or more of the TTIs of the flexible portion 225 for uplink or downlink communications. Thus, the dedicated pattern may override flexible symbols in Common/Common2. In some cases, the flexible portion 225 may span at least a slot 235.

The flexible portion 225 may be re-configured by a dynamic SFI to have one or more of three different options.

In a first option 240, the flexible portion 225 may include a slot 325 with at least one downlink TTI, one or more flexible TTIs, and one or more uplink TTIs. In a second option 245, the flexible portion 225 may include a slot 235 with one or more flexible TTIs followed by one or more uplink TTIs. In a third option 250, the flexible portion 225 may include a slot 235 with just uplink TTIs. In a fourth option 255, the flexible portion 225 may include a slot 235 with just one or more downlink TTIs followed by one or more flexible TTIs. In a fifth option 260, the flexible portion 225 may include a slot 235 with just downlink TTIs.

UE 115-a may apply rules for determining the direction of a flexible TTI within a component carrier. For example, DCI scheduling uplink may have higher priority than RRC configuring downlink. If UE 115-a is configured by higher layers to receive a PDCCH, or a PSDCH, or a channel state indicator reference signal (CSI-RS) within the set of symbols of the slot, UE 115-a may receive the PDCCH or PDSCH or CSI-RS unless UE 115-a receives DCI (e.g., with format 0_1, 1_0, 1_1, or 2_3) that indicates to UE 115-a to transmit a PUSCH, a PUCCH, a PRACH, or a sounding reference signal (SRS) in at least one symbol of the set of symbols of the slot. If UE 115-a does receive a DCI with one of those formats, UE 115-a may not receive the PDCCH, PDSCH, or CSI-RS in the set of symbols of the slot. In some cases, UE 115-a may then transmit the PUSCH, PUCCH, PRACH, or SRS on the at least one symbol of the set of symbols.

In another example, DCI scheduling downlink may have a higher priority than RRC configuring uplink. For example, UE 115-a may be configured by higher layers to transmit periodic SRS, or PUCCH, or PUSCH, or PRACH in a set of symbols of a slot, and UE 115-a detects a DCI format 1_0, DCI format 1_1, or DCI format 0_1 indicating for UE 115-a to receive CSI-RS or PDSCH in a subset of symbols from the set of symbols. UE 115-a may cancel the PUCCH, or PUSCH, or PRACH transmission in remaining symbols from the set of symbols and cancel the periodic SRS transmission in remaining symbols from the subset of symbols. In some cases, UE 115-a may not expect to cancel the transmission in symbols from the subset of symbols that occur relative to a last symbol of a control resource set, where UE 115-a detects the DCI format 1_0, DCI format 1_1, or DCI format 0_1, after a number of symbols that are smaller than the PUSCH preparation time based on processing capability of UE 115-a.

In some cases, the SFIs 210 transmitted by cell 205-a and cell 205-b may indicate to UE 115-a to transmit or receive in different directions at the same time. If UE 115-a is configured to operate according to half-duplex communications or cannot operate according to full-duplex communications, UE 115-a may be unable to both transmit and receive at the same time as indicated by the multiple SFIs 210. Thus, UE 115-a and other UEs 115 described herein may implement techniques to determine whether to drop a transmission on an allocation 215 or whether to use the allocation 215 to transmit or receive. The determination of whether to drop the transmission may be based on a type of one or more SFIs 210 received from a reference cell (e.g., SFI 210-a from cell 205-a) and a type of one or more SFIs received from a secondary cell (e.g., SFI 210-b from cell 205-b).

If a symbol in the reference cell (e.g., cell 205-a) is indicated as downlink by a common configuration (e.g., TDD-UL-DL-ConfigurationCommon) or dedicated configuration (e.g., TDD-UL-DL-ConfigDedicated), if UE 115-a is configured by a higher layer to monitor any downlink (DL) transmissions in the symbol, or if UE 115-a perform an SSB-based intra-frequency radio resource management (RRM) measurement in the symbol, then UE 115-a may not expect to receive a DCI format any uplink (UL) transmissions. UE 115-a may also not transmit higher-layer configured transmissions on another cell in the band overlapping with the symbol. In some cases, UE 115-a may then not be required to transmit higher-layer configured transmissions on another cell in the band overlapping with the symbol. If a symbol in the reference cell is indicated as uplink by a common configuration or dedicated configuration, or other higher layer configuration, UE 115-a may not expect to receive DCI scheduling downlink transmission. UE 115-a may also not receive higher-layer configured transmissions on another cell in the band combination overlapping the symbol.

In some cases, UE 115-a may not expect to receive, for one cell, a DCI format 1_0, DCI format 1_1 or DCI format 0_1 scheduling PDSCH or CSI-RS in a symbol, a DCI format 2_0 indicating the symbol as downlink, a DCI format 0_0, DCI format 0_1, DCI format 1_0, DCI format 1_1, or DCI format 2_3 scheduling PUSCH, PUCCH, PRACH, or SRS in the symbol or DCI format 2_0 indicating the symbol to be uplink that is contradicting with indicated link direction on the other cell. This may preclude unwanted base station dynamic behavior. In some cases, the reference cell may be the primary cell if the primary cell belongs to the band combination of the carrier aggregation configuration. In some cases, the reference cell may be the serving cell with the smallest cell index across the serving cells in the band combination.

In an example, a reference cell or a secondary cell, or both, may transmit a semi-static SFI to configure a set of flexible TTIs, including a first TTI. The reference cell may transmit an RRC-configured SFI to assign the first TTI to a first direction for the reference cell. The UE may also receive one or more SFIs from the secondary cell which configure the first TTI for the secondary cell. In some cases, the configuration for the secondary cell may contradict, or assign the first TTI in an opposite direction from, the configuration for the reference cell. Thus, the UE may seem to have a conflicting assignment for the first TTI. In some cases, the UE may give priority to the RRC-configured SFI of the reference cell over dynamic and RRC-configured SFIs received from other cells. The UE may drop the assignments for the other cells if they contradict the configuration for the reference cell. However, the reference cell may transmit a dynamic SFI (e.g., based on a grant dynamically indicating a direction) to re-assign the first TTI. In these cases, the UE may consider how the dynamic SFI from the reference cell modifies the assignment of the first TTI, as the dynamic SFI may re-assign the direction configured by the RRC-configured SFI such that the SFI received from the secondary cell is not contradicting. The UE may perform directional resolution for the reference cell, then determine whether to drop an assignment and which assignment to drop based on the direction resolution. In some cases, semi-static downlink may include RRC configured downlink (e.g., PDCCH monitoring). In some cases, semi-static uplink may include RRC configured uplink (e.g., periodic CSI/SRS transmission).

In a first example, UE 115-a may be configured to follow behavior as described by Table 1 below. UE 115-a may identify how the reference cell (e.g., cell 205-a) and the other cell (e.g., cell 205-b) are scheduled and select a cell to drop based on the identifying. According to the first example, UE 115-a may select which transmission to drop based on the RRC configuration, and UE 115-a may not consider that some TTIs assigned by the RRC configuration may be overwritten by dynamic signaling.

TABLE 1

| Reference Cell | Other Cell | Prioritization |
|---|---|---|
| Semi-static DL SFI | Semi-static UL SFI | Error Case |
| | RRC conf UL | UE is allowed to drop UL |
| | Dynamic UL | UE is allowed to drop UL |
| RRC conf DL | Semi-static UL SFI | Error Case |
| | RRC conf UL | UE is allowed to drop UL |
| | Dynamic UL | UE is allowed to drop UL |
| Semi-static UL SFI | Semi-static DL SFI | Error Case |
| | RRC conf DL | UE is allowed to drop DL |
| | Dynamic DL | UE is allowed to drop DL |
| RRC conf UL | Semi-static DL SFI | Error Case |
| | RRC conf DL | UE is allowed to drop DL |
| | Dynamic DL | UE is allowed to drop DL |

If the reference cell is configured for semi-static DL SFI, and the other cell is configured for RRC configured uplink or dynamic uplink, UE 115-a may drop the uplink. The semi-static SFI in the reference cell may decide a direction. If the reference cell is configured for RRC configured downlink and the other cell is configured for RRC configured uplink or dynamic uplink, UE 115-a may drop the uplink. If the reference cell is configured for semi-static uplink SFI and the other cell is configured for RRC configured downlink or dynamic downlink, UE 115-a may drop the downlink. The semi-static SFI in the reference cell may decide the direction. If the reference cell is configured for RRC configured uplink and the other cell is configured for RRC configured downlink or dynamic downlink, UE 115-a may drop the downlink. For any of the examples of table 1, if the other cell is configured by semi-static downlink SFI, UE 115-a may detect an error case.

In a second example, UE 115-a may determine whether to drop transmission on the allocation 215, or which direction to transmit, according to Table 2 below. In the second example, UE 115-a may consider directional resolution for a component carrier before deciding to drop a transmission. For example, UE 115-a may detect a directional contradiction between the RRC configured downlink of the reference cell and the RRC configured uplink or dynamic uplink of the other cell. However, UE 115-a may determine whether dynamic signaling at the reference cell has changed any of the TTIs of the allocation to uplink before deciding to drop the uplink. If the TTIs of the allocation have been changed to uplink by dynamic signaling at the reference sell, then there may not actually be a directional collision with the other cell, and UE 115-a may not drop the transmission. In some cases, a dynamic SFI or a dynamic grant may change the direction for one or more TTIs of the reference cell. If the reference cell is configured for downlink by a semi-static SFI and the other cell is configured for uplink by RRC configuring or dynamic signaling, the semi-static SFI in the reference cell may decide the transmission direction. If the reference cell is configured for uplink by a semi-static SFI and the other cell is configured for downlink by RRC configuring or dynamic signaling, the semi-static SFI in the reference cell may decide the transmission direction.

TABLE 2

| Reference Cell | Other Cell | Prioritization |
|---|---|---|
| Semi-static DL SFI | Semi-static UL SFI | Error case |
| | RRC conf UL | UE is allowed to drop UL |

TABLE 2-continued

| Reference Cell | Other Cell | Prioritization |
|---|---|---|
| | Dynamic UL | UE is allowed to drop UL |
| RRC conf DL* | Semi-static UL SFI | Error case |
| | RRC conf UL | UE is allowed to drop UL |
| | Dynamic UL | UE is allowed to drop UL |
| Semi-static UL SFI | Semi-static DL SFI | Error case |
| | RRC conf DL | UE is allowed to drop DL |
| | Dynamic DL | UE is allowed to drop DL |
| RRC conf UL* | Semi-static DL SFI | Error case |
| | RRC conf DL | UE is allowed to drop DL |
| | Dynamic DL | UE is allowed to drop DL |

In a third example, UE 115-a may follow the behavior described by Table 3. In the third example, UE 115-a may be able to drop the downlink in the reference cell if UE 115-a detects that the reference cell is scheduled for RRC configured downlink and the other cell is configured for dynamic uplink. Similarly, UE 115-a may be able to drop the RRC configured uplink in the reference cell if the other cell is scheduled for dynamic downlink. The determination for the third example may take place after resolution within the reference cell. For example, RRC configured uplink or downlink may not be cancelled by dynamic uplink or dynamic downlink.

TABLE 3

| Reference Cell | Other Cell | Prioritization |
|---|---|---|
| Semi-static DL SFI | Semi-static UL SFI | Error case |
| | RRC conf UL | UE is allowed to drop UL |
| | Dynamic UL | UE is allowed to drop UL |
| RRC conf DL* | Semi-static UL SFI | Error case |
| | RRC conf UL | UE is allowed to drop UL |
| | Dynamic UL | UE is allowed to drop DL in reference cell |
| Semi-static UL SFI | Semi-static DL SFI | Error case |
| | RRC conf DL | UE is allowed to drop DL |
| | Dynamic DL | UE is allowed to drop DL |
| RRC conf UL* | Semi-static DL SFI | Error case |
| | RRC conf DL | UE is allowed to drop DL |
| | Dynamic DL | UE is allowed to drop DL in reference cell |

In the third example, semi-static SFI in the reference cell may decide the direction UE 115-a transmits in. An RRC configured direction in the reference cell may be maintained if it is not cancelled by any dynamic direction in all the paired other cells. The RRC configured direction in the other cells may be cropped if it conflicts with or is different from an RRC configured direction in the reference cell after the reference cell direction resolution. Directional conflict between semi-static SFI may be considered as an error case. Directional conflicts between an RRC configured direction in the reference cell and a semi-static SFI in other cells may be considered as an error case. If the reference cell is configured for downlink by a semi-static SFI and the other cell is configured for uplink by RRC configuring or dynamic signaling, the semi-static SFI in the reference cell may decide the transmission direction. If the reference cell is configured for uplink by a semi-static SFI and the other cell is configured for downlink by RRC configuring or dynamic signaling, the semi-static SFI in the reference cell may decide the transmission direction.

In a fourth example, UE 115-a may follow behavior as described in Table 4. UE 115-a may have a capability to operate according to Table 4 below. For example, as long as there is a dynamic grant, the dynamic grant may take priority (e.g., irrespective of the reference cell or other cells). This may include the case of symbols or TTIs configured by both RRC and dynamic signaling. If there is not dynamic grant, the reference cell may have a higher priority. A dynamic SFI may not affect direction for other cells. For example, dynamic downlink or dynamic uplink in Table 4 may not include dynamic SFI.

TABLE 4

| Reference cell | Other cell | Outcome | Action |
|---|---|---|---|
| Semi SFI DL | Semi SFI DL | Ok | |
| | RRC DL | Ok | |
| | Dynamic DL | Ok | |
| | Semi SFI UL | Error case | |
| | RRC UL | Allowed to drop UL | Dropping on other cell |
| | Dynamic UL | Allowed to drop DL | Dropping on ref cell |
| RRC DL | Semi SFI DL | Ok | |
| | RRC DL | Ok | |
| | Dynamic DL | Ok | |
| | Semi SFI UL | Allowed to drop UL | Dropping on other cell |
| | RRC UL | Allowed to drop UL | Dropping on other cell |
| | Dynamic UL | Allowed to drop DL | Dropping on ref cell |
| Dynamic DL | Semi SFI DL | Ok | |
| | RRC DL | Ok | |
| | Dynamic DL | Ok | |
| | Semi SFI UL | Allowed to drop UL | Dropping on other cell |
| | RRC UL | Allowed to drop UL | Dropping on other cell |
| | Dynamic UL | Error case | |
| Semi SFI UL | Semi SFI DL | Error case | |
| | RRC DL | Allowed to drop DL | Dropping on other cell |
| | Dynamic DL | Allowed to drop UL | Dropping on ref cell |
| | Semi SFI UL | Ok | |
| | RRC UL | Ok | |
| | Dynamic UL | Ok | |
| RRC UL | Semi SFI DL | Allowed to drop DL | Dropping on other cell |
| | RRC DL | Allowed to drop DL | Dropping on other cell |
| | Dynamic DL | Allowed to drop UL | Dropping on ref cell |
| | Semi SFI UL | Ok | |
| | RRC UL | Ok | |
| | Dynamic UL | Ok | |
| Dynamic UL | Semi SFI DL | Allowed to drop DL | Dropping on other cell |
| | RRC DL | Allowed to drop DL | Dropping on other cell |
| | Dynamic DL | Error case | |
| | Semi SFI UL | Ok | |
| | RRC UL | Ok | |
| | Dynamic UL | Ok | |

For a baseline UE 115 which does not have the capability to follow Table 4, the baseline UE 115 may apply rules (e.g., directional resolution based on the RRC signaling and dynamic signaling) to determine direction for each cell. After resolution on each cell, any conflicts between cells may be considered an error case. In some cases, the baseline UE 115 may follow direction on the reference cell after resolution for each cell. The baseline UE 115 may not be expected to adjust its configuration, and the network (e.g., including the serving cells) may accommodate the baseline UE 115. Therefore, the network may not be as restricted if there are few half-duplex UEs in the network. The network may be able to more freely set semi-static SFI configurations per cell.

In some cases, if the reference cell is configured for semi-static SFI downlink (e.g., Semi SFI DL) and the other cell is configured for semi-static SFI uplink, UE 115-a may be able to drop the semi-static SFI uplink of the other cell. This may be shown by Table 5 below. Similarly, if the reference cell is configured for semi-static SFI uplink, and the other cell is configured for semi-static SFI downlink, UE 115-a may be able to drop the semi-static SFI downlink of the other cell.

TABLE 5

| Reference cell | Other cell | Outcome | Action |
|---|---|---|---|
| Semi SFI DL | Semi SFI DL | Ok | |
| | RRC DL | Ok | |
| | Dynamic DL | Ok | |
| | Semi SFI UL | Allowed to drop UL | |
| | RRC UL | Allowed to drop UL | Dropping on other cell |
| | Dynamic UL | Allowed to drop DL | Dropping on ref cell |
| RRC DL | Semi SFI DL | Ok | |
| | RRC DL | Ok | |
| | Dynamic DL | Ok | |
| | Semi SFI UL | Allowed to drop UL | Dropping on other cell |
| | RRC UL | Allowed to drop UL | Dropping on other cell |
| | Dynamic UL | Allowed to drop DL | Dropping on ref cell |
| Dynamic DL | Semi SFI DL | Ok | |
| | RRC DL | Ok | |
| | Dynamic DL | Ok | |
| | Semi SFI UL | Allowed to drop UL | Dropping on other cell |
| | RRC UL | Allowed to drop UL | Dropping on other cell |
| | Dynamic UL | Error case | |
| Semi SFI UL | Semi SFI DL | Allowed to drop DL | |
| | RRC DL | Allowed to drop DL | Dropping on other cell |
| | Dynamic DL | Allowed to drop UL | Dropping on ref cell |
| | Semi SFI UL | Ok | |
| | RRC UL | Ok | |
| | Dynamic UL | Ok | |
| RRC UL | Semi SFI DL | Allowed to drop DL | Dropping on other cell |
| | RRC DL | Allowed to drop DL | Dropping on other cell |
| | Dynamic DL | Allowed to drop UL | Dropping on ref cell |
| | Semi SFI UL | Ok | |
| | RRC UL | Ok | |
| | Dynamic UL | Ok | |
| Dynamic UL | Semi SFI DL | Allowed to drop DL | Dropping on other cell |
| | RRC DL | Allowed to drop DL | Dropping on other cell |
| | Dynamic DL | Error case | |
| | Semi SFI UL | Ok | |
| | RRC UL | Ok | |
| | Dynamic UL | Ok | |

In some intra-band cases, it may be appropriate for semi-static and SFI downlink/uplink configurations to be consistent across cells. However, the inter-band case may differ in some cases. For example, if a base station 105 is full-duplex and most UEs 115 are full-duplex, then only a few UEs 115 may be half-duplex. It may be unlikely that the base station 105 would reconfigure the semi-static downlink/uplink patterns to accommodate the few half-duplex UEs. Therefore, to improve chances of half-duplex UE adoption, some limitations on base station flexibility may be lifted. For example, semi-static downlink/uplink configurations across cells may not be required to be consistent. Therefore, a fifth example may describe some flexible rules for inter-band configurations. These configurations may also be appropriate for intra-band configurations.

In the fifth example, dynamic downlink/uplink on a cell may overwrite other settings, irrespective of reference cells vs. other cells. Dynamic downlink/uplink may include granted PDSCH, PUSCH, aperiodic SRS, aperiodic CSI, aperiodic CSI-RS, HARQ ACK, contention-based random access (CBRA), and contention-free random access (CFRA). In some cases, dynamic downlink/uplink may not include dynamic SFI. Conflict (e.g., difference) between dynamic downlink and dynamic uplink across cells may be an error case. The conflict may include timing advance (TA) errors, where even a small overlap from the TA may be considered an error case.

In the fifth example, in the lack of any dynamic grant or dynamic SFI, the UE 115 may follow the downlink/uplink determination rules of each cell. In the case of directional conflict (e.g., downlink vs. uplink conflict), resolution may be in favor of the reference cell. For example, the UE 115 may not be required to transmit/receive in a non-reference cell in case of directional conflict. No conflict resolution may be applied to flexible symbols in general. Similar techniques may be applied in the presence of dynamic SFI, but conflict resolution may be applied after the SFI contents are independently applied to each cell. This may use a timeline check.

If any cases of the fifth example would result in a situation with insufficient processing time, the UE 115 may not, or may not be required to, cancel ongoing operation. The UE may not cancel a transmission if the DCI (dynamic grant or SFI) that would cause the cancellation is not received at least N2 before the start of the transmission in the given slot. This may be evaluated in the slots (e.g., in each slot) to improve handling of multi-slot transmission. In some cases, the fifth example may be applicable for multiple different numerologies. In the case of intra-band carrier aggregation, the UE may not be configured with conflicting semi-static downlink/uplink direction configuration across cells.

UE 115-*a* may also be configured to handle dynamic downlink/uplink in the reference cell. In a first case, dynamic downlink/uplink with any conflict with other cells may be considered as an error case. In a second case, as dynamic downlink/uplink may have a higher priority than RRC configured downlink/uplink, UE 115-*a* may give higher priority for the reference cell dynamic downlink/uplink. Between dynamic downlink/uplink in the reference cell and RRC-configured downlink/uplink in other cells, UE 115-*a* may be supported to drop RRC-configured downlink/uplink in other cells. Conflict between dynamic downlink/uplink in the reference cell and semi-static SFI downlink/uplink in other cells may still be considered as an error case.

In some cases, half-duplex UEs from GC-PDCCH offline may be configured to follow per-cell rules to resolve conflicts and determine whether a transmission or reception is needed. If there is conflict between cells for transmission and reception which partially overlap in time, the half-duplex UEs may make a determination. If the conflicting transmission and reception are dynamically granted, the UE 115 may determine an error case. If the conflicting transmission and reception are UE-specific RRC configured, the UE 115 may determine this is an error case. If the conflicting transmission or reception is dynamically granted transmission/reception and the communication in the opposite direction is UE-specific RRC configured, the UE 115 may follow the dynamically granted communication direction.

In another example, the UE 115 may merge the RRC configured uplink/downlink configuration into a merged RRC configured uplink/downlink configuration and merge the SFI for the two cells together into a merged SFI. In some cases, the UE 115 may use the merged RRC configured UL/DL configuration and merged SFI for each cell.

In some cases, the UE 115 may follow a per-cell rule to resolve conflicts and to decide if a transmission or reception is needed. If there is conflict among cells for transmissions and receptions that at least partially overlap in time, the UE 115 may determine the transmission or reception priority using the cell index starting from the primary cell (e.g., index 0).

Figure 3:
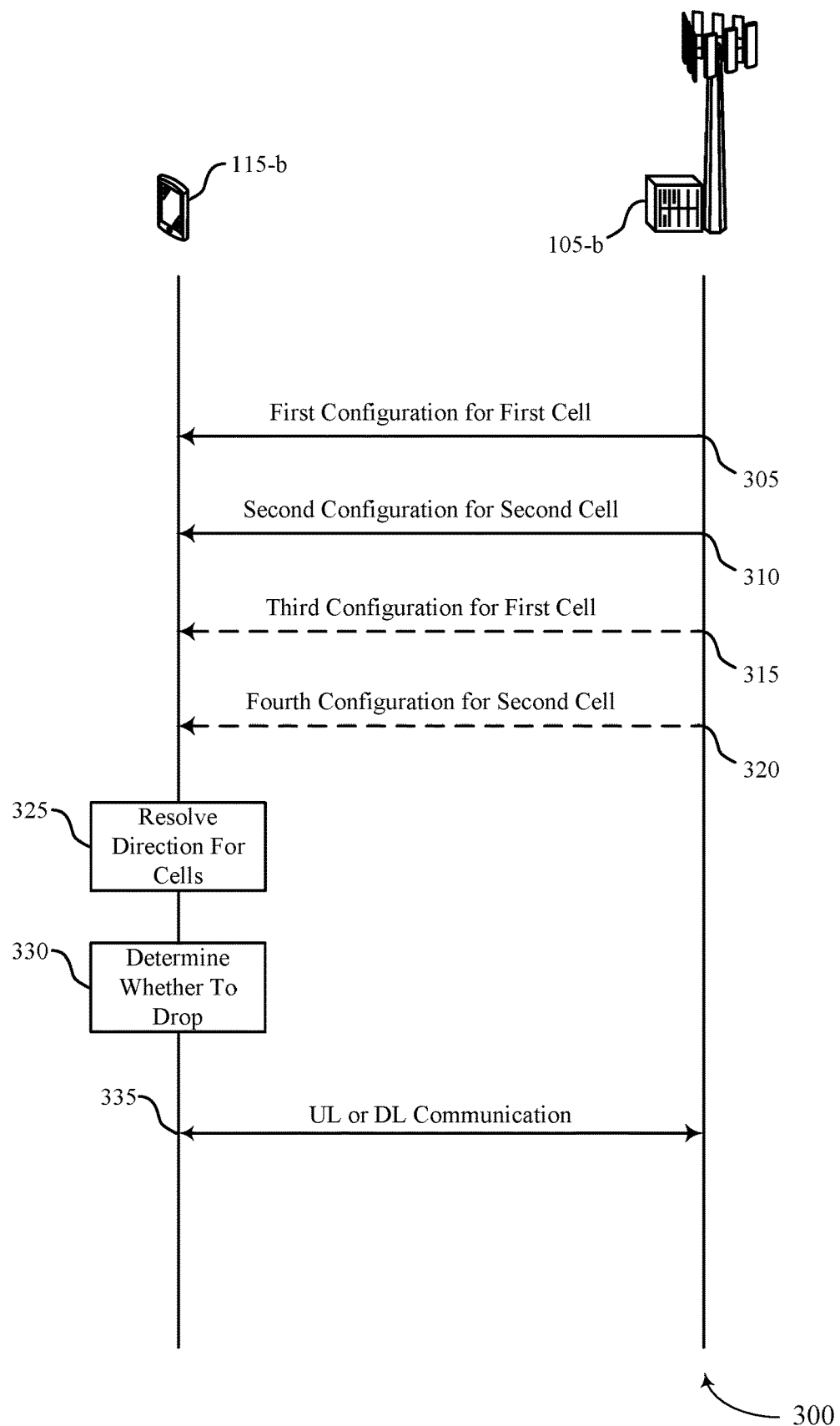
FIG. 3 illustrates an example of a process flow that supports half duplex handling in carrier aggregation in accordance with aspects of the present disclosure.

FIG. 3 illustrates an example of a process flow 300 that supports half duplex handling in carrier aggregation in accordance with aspects of the present disclosure. In some examples, process flow 300 may implement aspects of wireless communications system 100. Process flow 300 may include base station 105-*b* and UE 115-*b*, which may be respective examples of a base station 105 and a UE 115 as described herein. In some cases, base station 105-*b* may provide multiple cells for UE 115-*b*, where each cell provides a component carrier of a carrier aggregation configuration. In some other examples, other base stations 105 may provide cells for the carrier aggregation configuration. Base stations 105 may be examples of TRPs.

At 305, UE 115-*b* may receive a first slot format configuration for a first serving cell for a set of TTIs that include a first TTI. The first slot format configuration may include a first TTI, and the first slot format configuration may indicate a first communication direction for the first TTI. At 310, UE 115-*b* may receive, following the first slot format configuration, a second slot format configuration for the first serving cell for at least the first TTI, the second slot format configuration for the first TTI conflicting with (e.g., being different from) the first slot format configuration for the first TTI. The second slot configuration may include a second communication direction for the first TTI on the second serving cell.

At 325, UE 115-*b* may resolve a transmission direction for the first cell. For example, UE 115-*b* may determine, based on the second slot format configuration having a higher priority than the first format configuration, a first communication direction for the first serving cell for the first TTI. UE 115-*b* may identify, for a second serving cell for the first TTI, a second communication direction indicated by one or more slot format configurations for the second serving cell. In some cases, determining the first communication direction includes determining that the first TTI is downlink based on the received first slot format configuration and the received second slot format configuration, where the received first slot format configuration for the first serving cell includes RRC signaling identifying the first TTI as uplink, and the second slot format configuration for the first serving cell includes DCI or a dynamic SFI (e.g., based on a dynamic grant) identifying the first TTI as downlink.

In some cases, identifying the second communication direction indicated by the one or more slot format configurations for the second serving cell may be based on receiving a third slot format configuration for the second serving cell for a set of TTIs that include the first TTI at 315. In some cases, UE 115-*b* may receive a fourth slot format configuration for the second serving cell for at least the first TTI, the second slot format configuration for the first TTI conflicting with the first slot format configuration for the first TTI at 320. UE 115-*b* may identify, based on the second slot format configuration having a higher priority than the first format configuration, a first communication direction for the first serving cell for the first TTI.

At 330, UE 115-*b* may determine, based on the determined first communication direction for the first serving cell and the identified second communication direction for the second serving cell, whether to communicate on the second serving cell for the first TTI according to the one or more slot format configurations for the second serving cell. UE 115-*b* may determine to communicate on the first serving cell in the first communication direction for the first TTI or on the second serving cell in the second communication direct for the first TTI based on determining that the first communication direction conflicts with or is different from the second communication direction.

For example, in some cases determining whether to communicate on the second serving cell for the first TTI includes determining to drop communications on the second serving cell based on the second communication direction conflicting with the first communication direction, the received first slot format configuration including an RRC signaling, and the second slot format configuration including DCI or a dynamic SFI. Or, in some cases, determining whether to communication on the second serving cell for the first TTI includes determining to drop communications on the first serving cell based on the second communication direction conflicting with the first communication direction, the received first slot format configuration including RRC signaling, and the second slot format configuration including DCI or a dynamic SFI. Further, dropping the communications on the second serving cell may be based on the first serving cell being in a different radio frequency spectrum band than the second serving cell.

In some cases, at 335, UE 115-*b* may communicate on the second serving cell for the first TTI according to the one or more slot configurations for the second serving cell and based on the determining.

Figure 4:
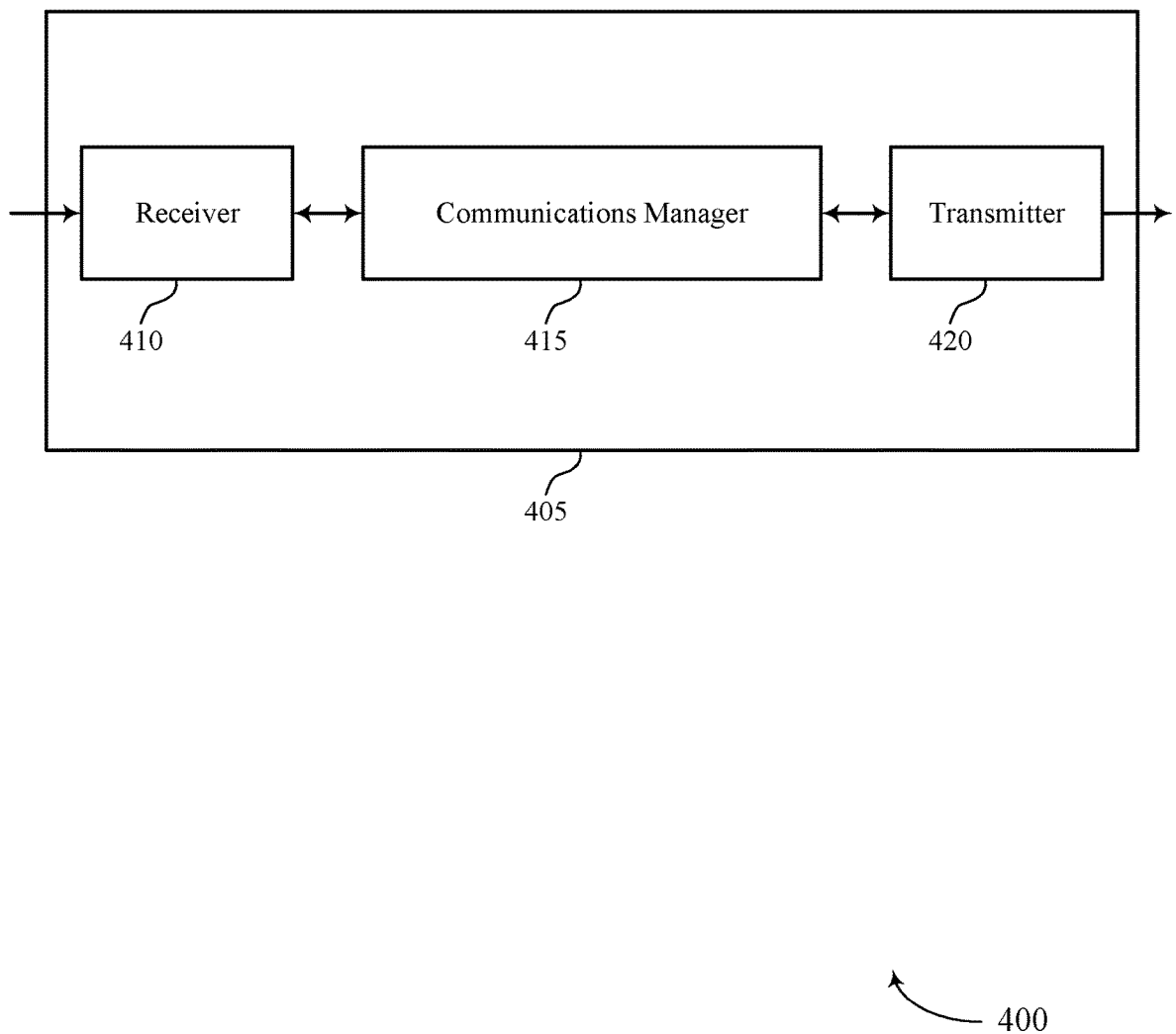
FIGS. 4 and 5 show block diagrams of devices that support half duplex handling in carrier aggregation in accordance with aspects of the present disclosure.

FIG. 4 shows a block diagram 400 of a device 405 that supports half duplex handling in carrier aggregation in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to half duplex handling in carrier aggregation, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a first slot format configuration for a first serving cell for a set of TTIs that include a first TTI, receive, following the first slot format configuration, a second slot format configuration for the first serving cell for at least the first TTI, the second slot format configuration for the first TTI conflicting with (e.g., being different from) the first slot format configuration for the first TTI, determine, based on the second slot format configuration having a higher priority than the first slot format configuration, a first one or more communication directions for the first serving cell for the first TTI, identify, for a second serving cell for the first TTI, a second one or more communication directions indicated by one or more slot format configurations for the second serving cell, and determine, based on whether the determined first one or more communication directions for the first serving cell conflicts with or is different from the identified second one or more communication directions for the second serving cell, and based on the one or more slot format configurations for the second serving cell, whether to communicate on the second serving cell for the first TTI according to the one or more slot format configurations for the second serving cell.

The communications manager 415 may receive a first slot format configuration for a first serving cell for a set of TTIs that includes a first TTI, the first slot format configuration indicating a first one or more communication directions for the first TTI, receive a second slot format configuration for a second serving cell for at least the first TTI, the second slot format configuration indicating a second one or more communication directions for the first TTI on the second serving cell, determine, for the first TTI, that the first one or more communication directions for the first serving cell conflicts with or is different from the second one or more communication directions for the second serving cell, and determine to communicate on the first serving cell in the first one or more communication directions for the first TTI or on the second serving cell in the second one or more communication directions for the first TTI based on determining that the first one or more communication directions conflicts with the second one or more communication directions, the first slot format configuration for the first serving cell, and the second slot format configuration for the second serving cell. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
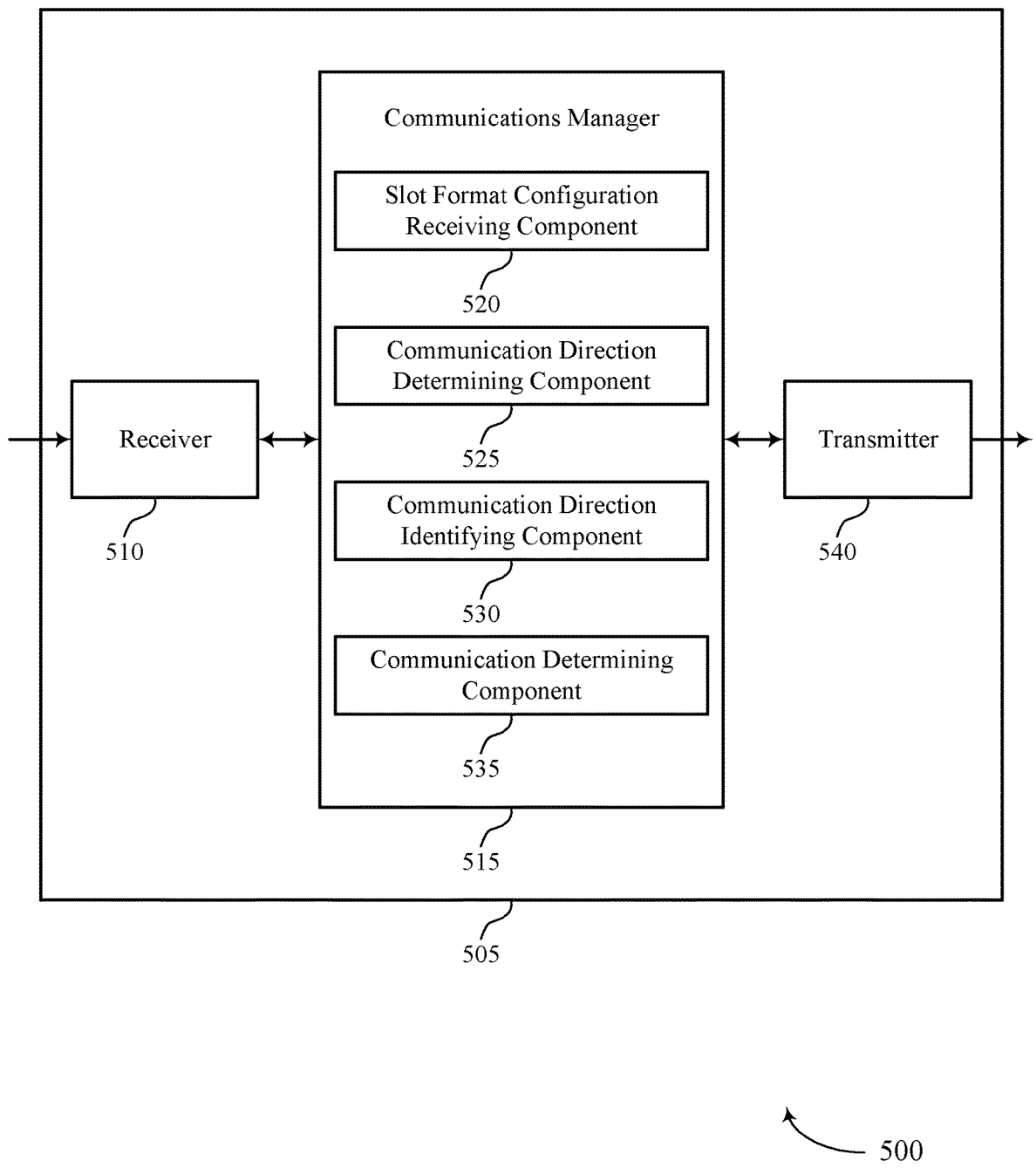

FIG. 5 shows a block diagram 500 of a device 505 that supports half duplex handling in carrier aggregation in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to half duplex handling in carrier aggregation, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a slot format configuration receiving component 520, a communication direction determining component 525, a communication direction identifying component 530, and a communication determining component 535. The communications manager 515 may be an example of aspects of the communications manager 710 described herein.

The slot format configuration receiving component 520 may receive a first slot format configuration for a first serving cell for a set of TTIs that include a first TTI and receive, following the first slot format configuration, a second slot format configuration for the first serving cell for at least the first TTI, the second slot format configuration for the first TTI conflicting with the first slot format configuration for the first TTI. The communication direction determining component 525 may determine, based on the second slot format configuration having a higher priority than the first slot format configuration, a first one or more communication directions for the first serving cell for the first TTI. The communication direction identifying component 530 may identify, for a second serving cell for the first TTI, a second one or more communication directions indicated by one or more slot format configurations for the second serving cell. The communication determining component 535 may determine, based on whether the determined first one or more communication directions for the first serving cell conflicts with the identified second one or more communication directions for the second serving cell, and based on the one or more slot format configurations for the second serving cell, whether to communicate on the second serving cell for the first TTI according to the one or more slot format configurations for the second serving cell.

The slot format configuration receiving component 520 may receive a first slot format configuration for a first serving cell for a set of transmission time intervals (TTIs) that includes a first TTI, the first slot format configuration indicating a first one or more communication directions for the first TTI and receive a second slot format configuration for a second serving cell for at least the first TTI, the second slot format configuration indicating a second one or more communication directions for the first TTI on the second serving cell.

The communication direction determining component 525 may determine, for the first TTI, that the first one or more communication directions for the first serving cell conflicts with the second one or more communication directions for the second serving cell.

The communication determining component 535 may determine to communicate on the first serving cell in the first one or more communication directions for the first TTI or on the second serving cell in the second one or more communication directions for the first TTI based on determining that the first one or more communication directions conflicts with the second one or more communication directions, the first slot format configuration for the first serving cell, and the second slot format configuration for the second serving cell.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
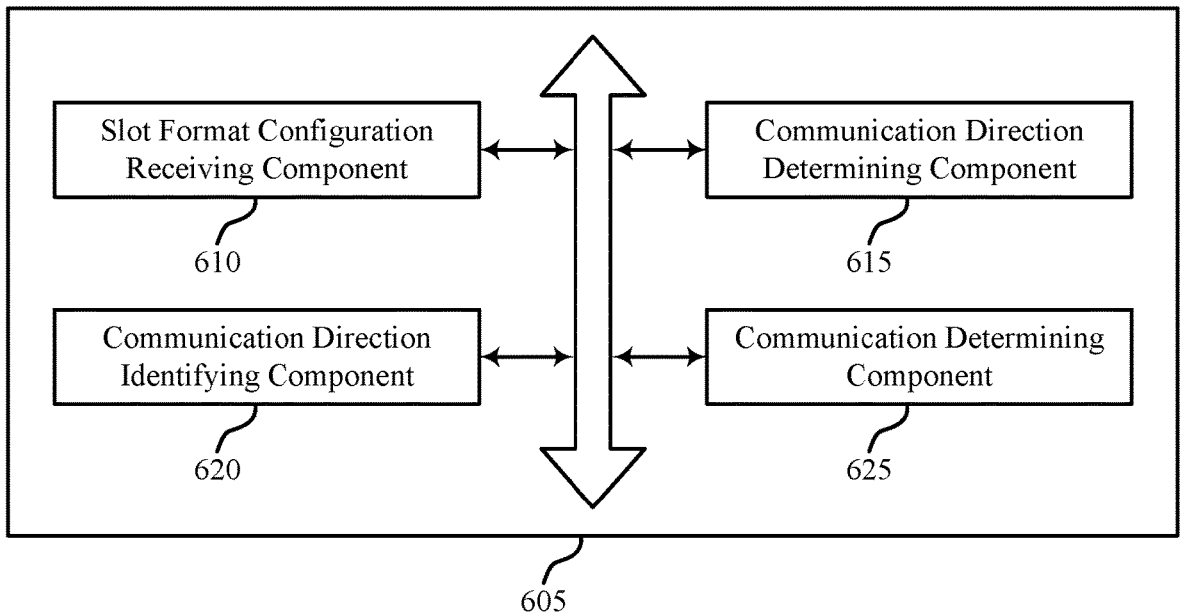
FIG. 6 shows a block diagram of a communications manager that supports half duplex handling in carrier aggregation in accordance with aspects of the present disclosure.

FIG. 6 shows a block diagram 600 of a communications manager 605 that supports half duplex handling in carrier aggregation in accordance with aspects of the present disclosure. The communications manager 605 may be an example of aspects of a communications manager 415, a communications manager 515, or a communications manager 710 described herein. The communications manager 605 may include a slot format configuration receiving component 610, a communication direction determining component 615, a communication direction identifying component 620, and a communication determining component 625. Each of these modules may communicate, directly or indirectly, with one another (e.g., via one or more buses).

The slot format configuration receiving component 610 may receive a first slot format configuration for a first serving cell for a set of TTIs that include a first TTI. In some cases, the slot format configuration receiving component 610 may receive a first slot format configuration for a first serving cell for a plurality of TTIs that includes a first TTI, the first slot format configuration indicating a first one or more communication directions for the first TTI. In some examples, the slot format configuration receiving component 610 may receive, following the first slot format configuration, a second slot format configuration for the first serving cell for at least the first TTI, the second slot format configuration for the first TTI conflicting with the first slot format configuration for the first TTI. In some cases, the slot format configuration receiving component 610 may receive a second slot format configuration for a second serving cell for at least the first TTI, the second slot format configuration indicating a second one or more communication directions for the first TTI on the second serving cell. In some examples, the slot format configuration receiving component 610 may receive a third slot format configuration for the second serving cell for a set of TTIs that include the first TTI. In some examples, the slot format configuration receiving component 610 may receive a fourth slot format configuration for the second serving cell for at least the first TTI, the fourth slot format configuration for the first TTI conflicting with the third slot format configuration for the first TTI.

The communication direction determining component 615 may determine, based on the second slot format configuration having a higher priority than the first slot format configuration, a first one or more communication directions for the first serving cell for the first TTI.

In some examples, determining that the first TTI is downlink based on the received first slot format configuration and the received second slot format configuration, where the received first slot format configuration for the first serving cell includes RRC signaling, and the second slot format configuration for the first serving cell includes DCI or a dynamic SFI identifying the first TTI as downlink, the method further including.

In some examples, determining that the first TTI is uplink based on the received first slot format configuration and the received second slot format configuration, where the received first slot format configuration for the first serving cell includes RRC signaling, and the second slot format configuration for the first serving cell includes DCI or a dynamic SFI identifying the first TTI as uplink, the method further including.

The communication direction identifying component 620 may identify, for a second serving cell for the first TTI, a second one or more communication directions indicated by one or more slot format configurations for the second serving cell. In some examples, the communication direction identifying component 620 may identify, based on the fourth slot format configuration having a higher priority than the third slot format configuration, a second one or more communication directions for the second serving cell for the first TTI. In some cases, the first serving cell and the second serving cell are within a same radio frequency spectrum band. In some cases, the first serving cell is within a first radio frequency spectrum band and the second serving cell is within a second radio frequency spectrum band. In some cases, the second serving cell includes one of a set of serving cells. In some cases, the first serving cell includes a reference serving cell, and the second service cell includes an other serving cell. In some cases, the reference serving cell includes a primary cell of a carrier aggregation configuration, and the other serving cell includes a secondary cell of the carrier aggregation configuration. In some cases, the reference serving cell includes a first secondary cell of a carrier aggregation configuration, and the other serving cell includes a second secondary cell of the carrier aggregation configuration.

The communication determining component 625 may determine, based on whether the determined first one or more communication directions for the first serving cell conflicts with the identified second one or more communication directions for the second serving cell, and based on the one or more slot format configurations for the second serving cell, whether to communicate on the second serving cell for the first TTI according to the one or more slot format configurations for the second serving cell. In some cases, the communication determining component 625 may determine, for the first TTI, that the first one or more communication directions for the first serving cell conflicts with the second one or more communication directions for the second serving cell.

In some examples, the communication determining component 625 may determine to drop an uplink communication on the second serving cell based on identifying the first TTI as downlink. In some examples, the communication determining component 625 may determine to drop a downlink communication on the second serving cell based on identifying the first TTI as uplink. In some cases, the communication determining component 625 may determine to communicate on the first serving cell in the first one or more communication directions for the first TTI or on the second serving cell in the second one or more communication directions for the first TTI based at least in part on determining that the first one or more communication directions conflicts with the second one or more communication directions, the first slot format configuration for the first serving cell, and the second slot format configuration for the second serving cell.

In some examples, determining to communicate on the first serving cell according to the first one or more communication directions and on the second serving cell according to the second one or more communication directions based on the first one or more communication directions and the second one or more communication directions includes a same communication direction. In some examples, the communication determining component 625 may determine to drop communications on the second serving cell based on the second one or more communication directions conflicting with the first one or more communication directions, the received first slot format configuration including an RRC signaling, and the second slot format configuration including DCI or a dynamic SFI. In some examples, the communication determining component 625 may determine to drop communications on the first serving cell based on the second one or more communication directions conflicting with the first one or more communication directions, the received first slot format configuration including a RRC signaling, and the second slot format configuration including DCI or a dynamic SFI.

The slot format configuration receiving component 610 may receive a first slot format configuration for a first serving cell for a set of transmission time intervals (TTIs) that includes a first TTI, the first slot format configuration indicating a first one or more communication directions for the first TTI. In some examples, the slot format configuration receiving component 610 may receive a second slot format configuration for a second serving cell for at least the first TTI, the second slot format configuration indicating a second one or more communication directions for the first TTI on the second serving cell. In some examples, the slot format configuration receiving component 610 may receive, following the first slot format configuration, a third slot format configuration for the first serving cell for at least the first TTI, the third slot format configuration for the first TTI indicating a third communication direction that conflicts with the first one or more communication directions for the first TTI.

In some cases, the first serving cell and the second serving cell are within a same radio frequency spectrum band. In some cases, the first serving cell is within a first radio frequency spectrum band and the second serving cell is within a second radio frequency spectrum band. In some cases, the second serving cell includes one of a set of serving cells. In some cases, the first serving cell includes a reference serving cell, and the second service cell includes an other serving cell. In some cases, the reference serving cell includes a primary cell of a carrier aggregation configuration, and the other serving cell includes a secondary cell of the carrier aggregation configuration. In some cases, the reference serving cell includes a first secondary cell of a carrier aggregation configuration, and the other serving cell includes a second secondary cell of the carrier aggregation configuration.

The communication direction determining component 615 may determine, for the first TTI, that the first one or more communication directions for the first serving cell conflicts with the second one or more communication directions for the second serving cell. In some examples, the communication direction determining component 615 may determine to compare the first one or more communication directions for the first serving cell to the second one or more communication directions for the second serving based on the first slot format configuration having a higher priority than the first slot format configuration.

The communication determining component 625 may determine to communicate on the first serving cell in the first one or more communication directions for the first TTI or on the second serving cell in the second one or more communication directions for the first TTI based on determining that the first one or more communication directions conflicts with the second one or more communication directions, the first slot format configuration for the first serving cell, and the second slot format configuration for the second serving cell. In some examples, the communication determining component 625 may determine, based on the first slot format configuration being a semi-static slot format indicator and the second slot format configuration including a second semi-static slot format indicator, to communicate on the first serving cell for the first TTI and to drop communications on the second serving cell for the first TTI. In some examples, the communication determining component 625 may drop the communications on the second serving cell is further based on the first serving cell being in a different radio frequency spectrum band than the second serving cell.

In some examples, the communication determining component 625 may determine, based on the first slot format configuration indicated by a semi-static slot format indicator of a first RRC signal and the second slot format configuration indicated by a second RRC signal, to communicate on the first serving cell for the first TTI and to drop communications on the second serving cell for the first TTT. In some examples, the communication determining component 625 may determine, based on the first slot format configuration being a semi-static slot format indication, the second slot format configuration including a dynamic slot format indication, the first one or more communication directions being downlink, and the second one or more communication directions being uplink, to communicate on the first serving cell for the first TTI and to drop communications on the second serving cell for the first TTI.

In some examples, the communication determining component 625 may determine, based on the first slot format configuration being received in first RRC signaling and the second slot format configuration being received in second RRC signaling, to communicate on the first serving cell for the first TTI and drop communications on the second serving cell for the first TTI. In some examples, the communication determining component 625 may determine, based on the first slot format configuration being received in RRC signaling and the second slot format configuration including a semi-static slot format indicator, to communicate on the first serving cell for the first TTI and to drop communications on the second serving cell for the first TTI. In some examples, the communication determining component 625 may determine, based on the first slot format configuration being received in RRC signaling and the second slot format configuration including a dynamic slot format indicator, to communicate on the first serving cell for the first TTI and to drop communications on the second serving cell for the second TTI.

Figure 7:
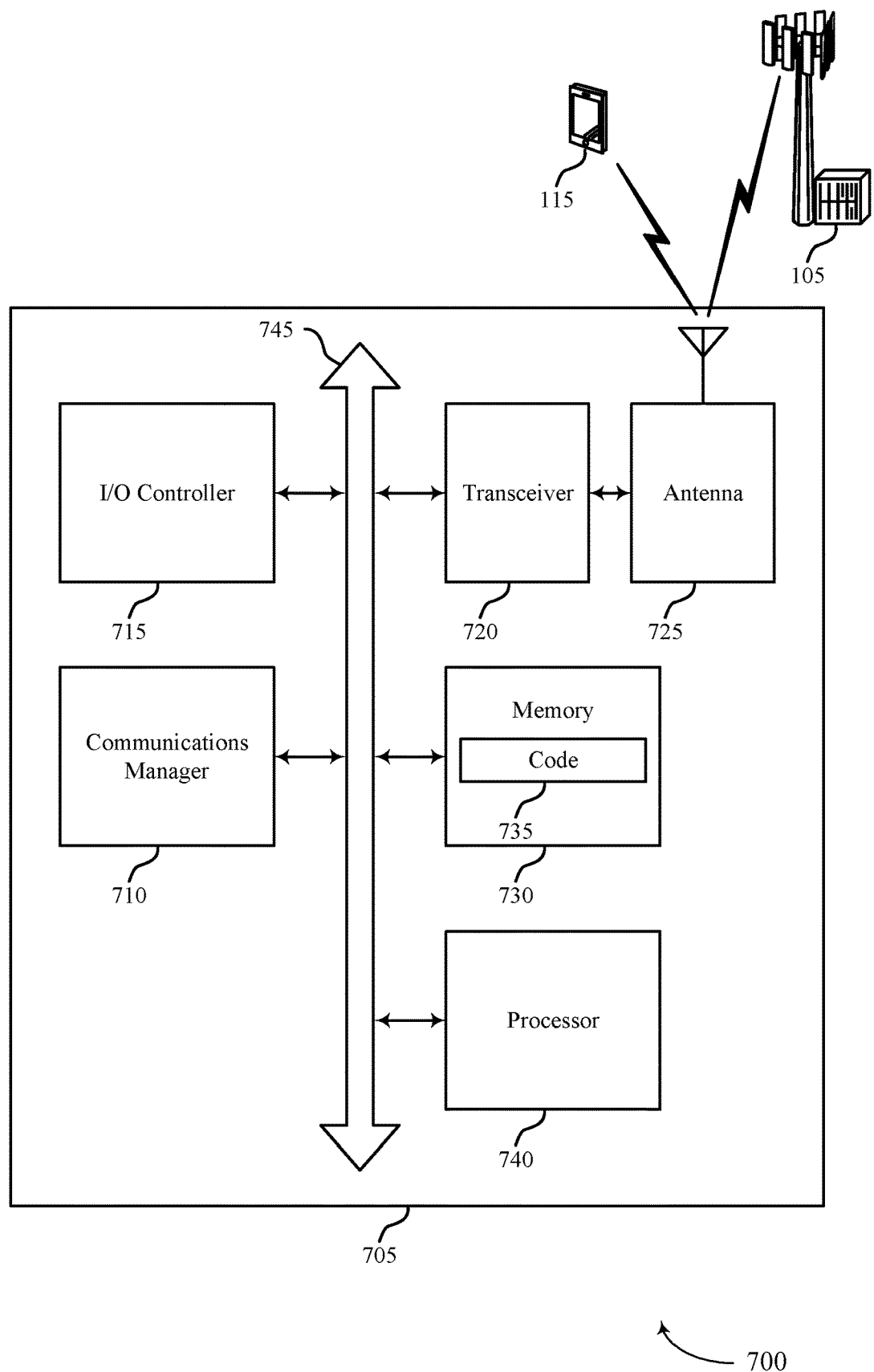
FIG. 7 shows a diagram of a system including a device that supports half duplex handling in carrier aggregation in accordance with aspects of the present disclosure.

FIG. 7 shows a diagram of a system 700 including a device 705 that supports half duplex handling in carrier aggregation in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a first slot format configuration for a first serving cell for a set of TTIs that include a first TTI, receive, following the first slot format configuration, a second slot format configuration for the first serving cell for at least the first TTI, the second slot format configuration for the first TTI conflicting with the first slot format configuration for the first TTI, determine, based on the second slot format configuration having a higher priority than the first slot format configuration, a first one or more communication directions for the first serving cell for the first TTI, identify, for a second serving cell for the first TTI, a second one or more communication directions indicated by one or more slot format configurations for the second serving cell, and determine, based on whether the determined first one or more communication directions for the first serving cell conflicts with the identified second one or more communication directions for the second serving cell, and based on the one or more slot format configurations for the second serving cell, whether to communicate on the second serving cell for the first TTI according to the one or more slot format configurations for the second serving cell.

The communications manager 710 may receive a first slot format configuration for a first serving cell for a set of transmission time intervals (TTIs) that includes a first TTI, the first slot format configuration indicating a first one or more communication directions for the first TTI, receive a second slot format configuration for a second serving cell for at least the first TTI, the second slot format configuration indicating a second one or more communication directions for the first TTI on the second serving cell, determine, for the first TTI, that the first one or more communication directions for the first serving cell conflicts with the second one or more communication directions for the second serving cell, and determine to communicate on the first serving cell in the first one or more communication directions for the first TTI or on the second serving cell in the second one or more communication directions for the first TTI based on determining that the first one or more communication directions conflicts with the second one or more communication directions, the first slot format configuration for the first serving cell, and the second slot format configuration for the second serving cell.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting half duplex handling in carrier aggregation).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
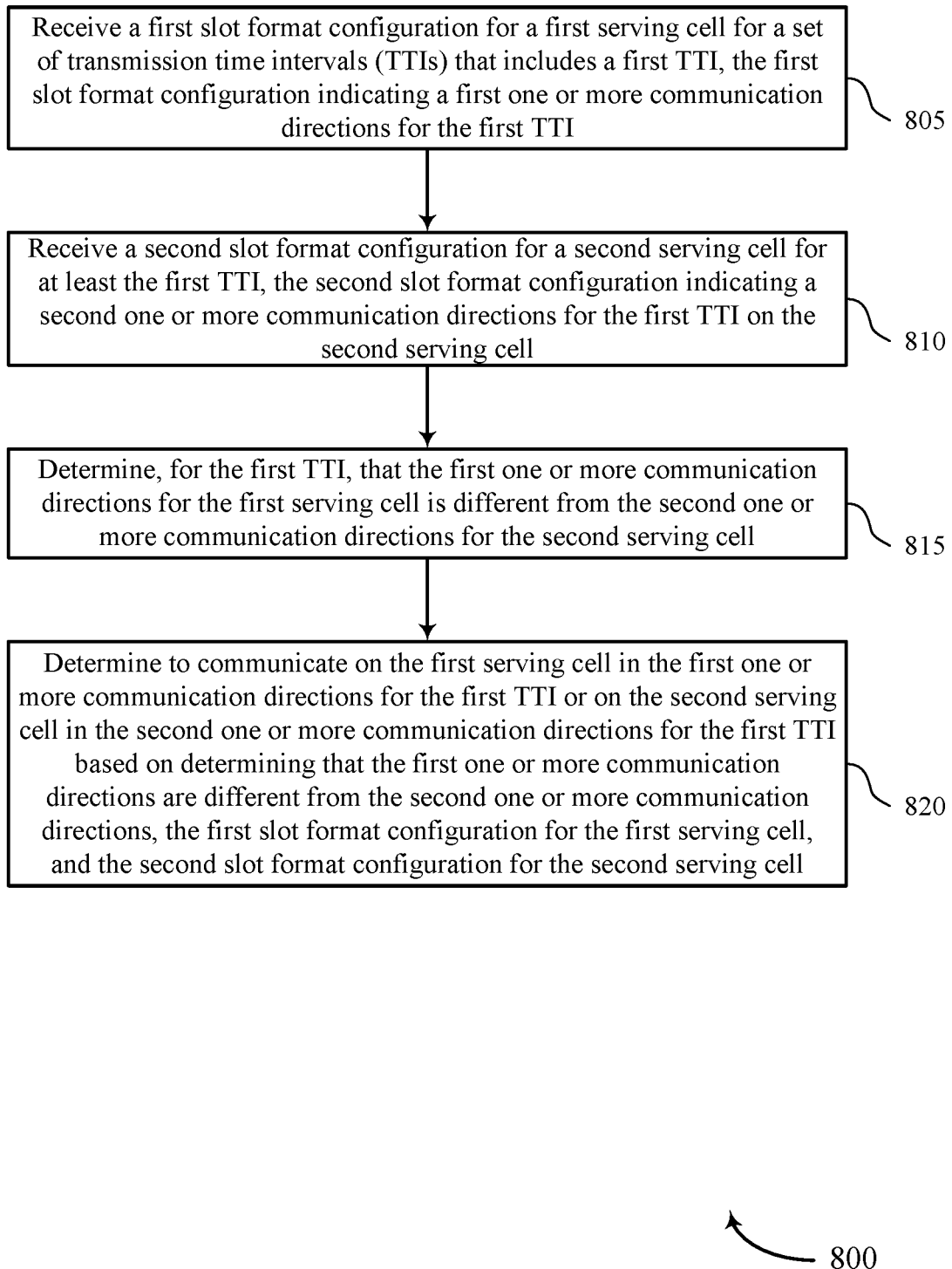
FIGS. 8 through 10 show flowcharts illustrating methods that support half duplex handling in carrier aggregation in accordance with aspects of the present disclosure.

FIG. 8 shows a flowchart illustrating a method 800 that supports half duplex handling in carrier aggregation in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 805, the UE may receive a first slot format configuration for a first serving cell for a set of transmission time intervals (TTIs) that includes a first TTI, the first slot format configuration indicating a first one or more communication directions for the first TTI. The operations of 805 may be performed according to the methods described herein. In some examples, aspects of the operations of 805 may be performed by a slot format configuration receiving component as described with reference to FIGS. 4 through 7.

At 810, the UE may receive a second slot format configuration for a second serving cell for at least the first TTI, the second slot format configuration indicating a second one or more communication directions for the first TTI on the second serving cell. The operations of 810 may be performed according to the methods described herein. In some examples, aspects of the operations of 810 may be performed by a slot format configuration receiving component as described with reference to FIGS. 4 through 7.

At 815, the UE may determine, for the first TTI, that the first one or more communication directions for the first serving cell conflicts with the second one or more communication directions for the second serving cell. The operations of 815 may be performed according to the methods described herein. In some examples, aspects of the operations of 815 may be performed by a communication direction determining component as described with reference to FIGS. 4 through 7.

At 820, the UE may determine to communicate on the first serving cell in the first one or more communication directions for the first TTI or on the second serving cell in the second one or more communication directions for the first TTI based on determining that the first one or more communication directions conflicts with (e.g., is different from) the second one or more communication directions, the first slot format configuration for the first serving cell, and the second slot format configuration for the second serving cell. The operations of 820 may be performed according to the methods described herein. In some examples, aspects of the operations of 820 may be performed by a communication determining component as described with reference to FIGS. 4 through 7.

Figure 9:
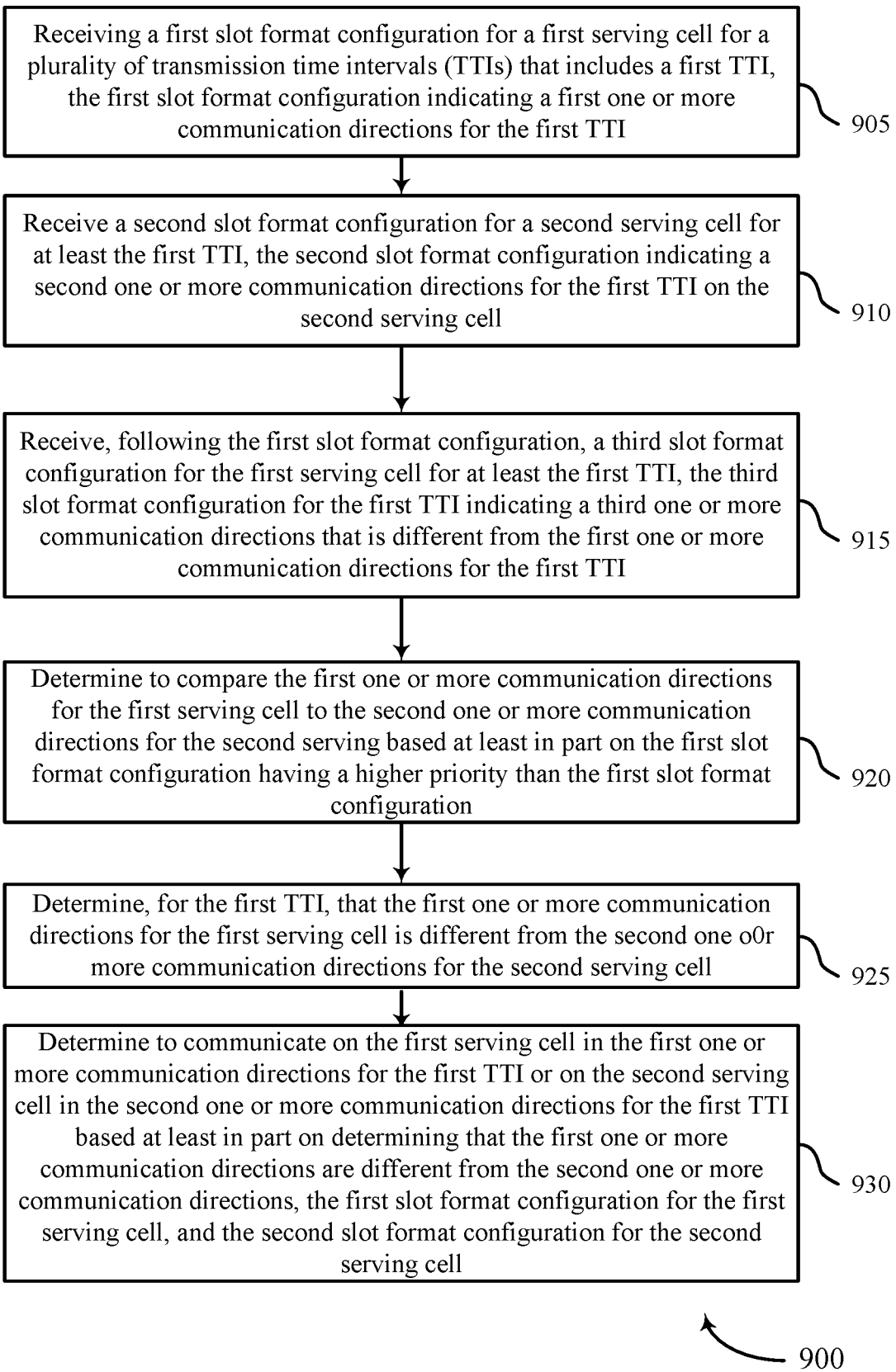

FIG. 9 shows a flowchart illustrating a method 900 that supports half duplex handling in carrier aggregation in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 905, the UE may receive a first slot format configuration for a first serving cell for a plurality of TTIs that includes a first TTI, the first slot format configuration indicating a first one or more communication directions for the first TTI. In some cases, the UE may receive a first slot format configuration for a first serving cell for a set of TTIs that include a first TTI. The operations of 905 may be performed according to the methods described herein. In some examples, aspects of the operations of 905 may be performed by a slot format configuration receiving component as described with reference to FIGS. 4 through 7.

At 910, the UE may receive a second slot format configuration for a second serving cell for at least the first TTI, the second slot format configuration indicating a second one or more communication directions for the first TTI on the second serving cell. In some cases, the UE may receive, following the first slot format configuration, a second slot format configuration for the first serving cell for at least the first TTI, the second slot format configuration for the first TTI conflicting with the first slot format configuration for the first TTI. The operations of 910 may be performed according to the methods described herein. In some examples, aspects of the operations of 910 may be performed by a slot format configuration receiving component as described with reference to FIGS. 4 through 7.

At 915, the UE may receive, following the first slot format configuration, a third slot format configuration for the first serving cell for at least the first TTI, the third slot format configuration for the first TTI indicating a third communication direction that conflicts with the first one or more communication directions for the first TTI. In some cases, the UE may receive a third slot format configuration for the second serving cell for a set of TTIs that include the first TTI. The operations of 915 may be performed according to the methods described herein. In some examples, aspects of the operations of 915 may be performed by a slot format configuration receiving component as described with reference to FIGS. 4 through 7.

At 920, the UE may determine to compare the first one or more communication directions for the first serving cell to the second one or more communication directions for the second serving based at least in part on the first slot format configuration having a higher priority than the first slot format configuration. The operations of 920 may be performed according to the methods described herein. In some examples, aspects of the operations of 920 may be performed by a slot format configuration receiving component as described with reference to FIGS. 4 through 7.

At 925, the UE may determine, for the first TTI, that the first one or more communication directions for the first serving cell conflicts with the second one or more communication directions for the second serving cell. In some cases, the UE may determine, based on the second slot format configuration having a higher priority than the first slot format configuration, a first one or more communication directions for the first serving cell for the first TTI. The operations of 925 may be performed according to the methods described herein. In some examples, aspects of the operations of 925 may be performed by a communication direction determining component as described with reference to FIGS. 4 through 7.

At 930, the UE may identify, for a second serving cell for the first TTI, a second one or more communication directions indicated by one or more slot format configurations for the second serving cell. The operations of 930 may be performed according to the methods described herein. In some examples, aspects of the operations of 930 may be performed by a communication direction identifying component as described with reference to FIGS. 4 through 7.

At 935, the UE may determine to communicate on the first serving cell in the first one or more communication directions for the first TTI or on the second serving cell in the second one or more communication directions for the first TTI based at least in part on determining that the first one or more communication directions conflicts with the second one or more communication directions, the first slot format configuration for the first serving cell, and the second slot format configuration for the second serving cell. The operations of 935 may be performed according to the methods described herein. In some examples, aspects of the operations of 935 may be performed by a communication direction identifying component as described with reference to FIGS. 4 through 7.

Figure 10:
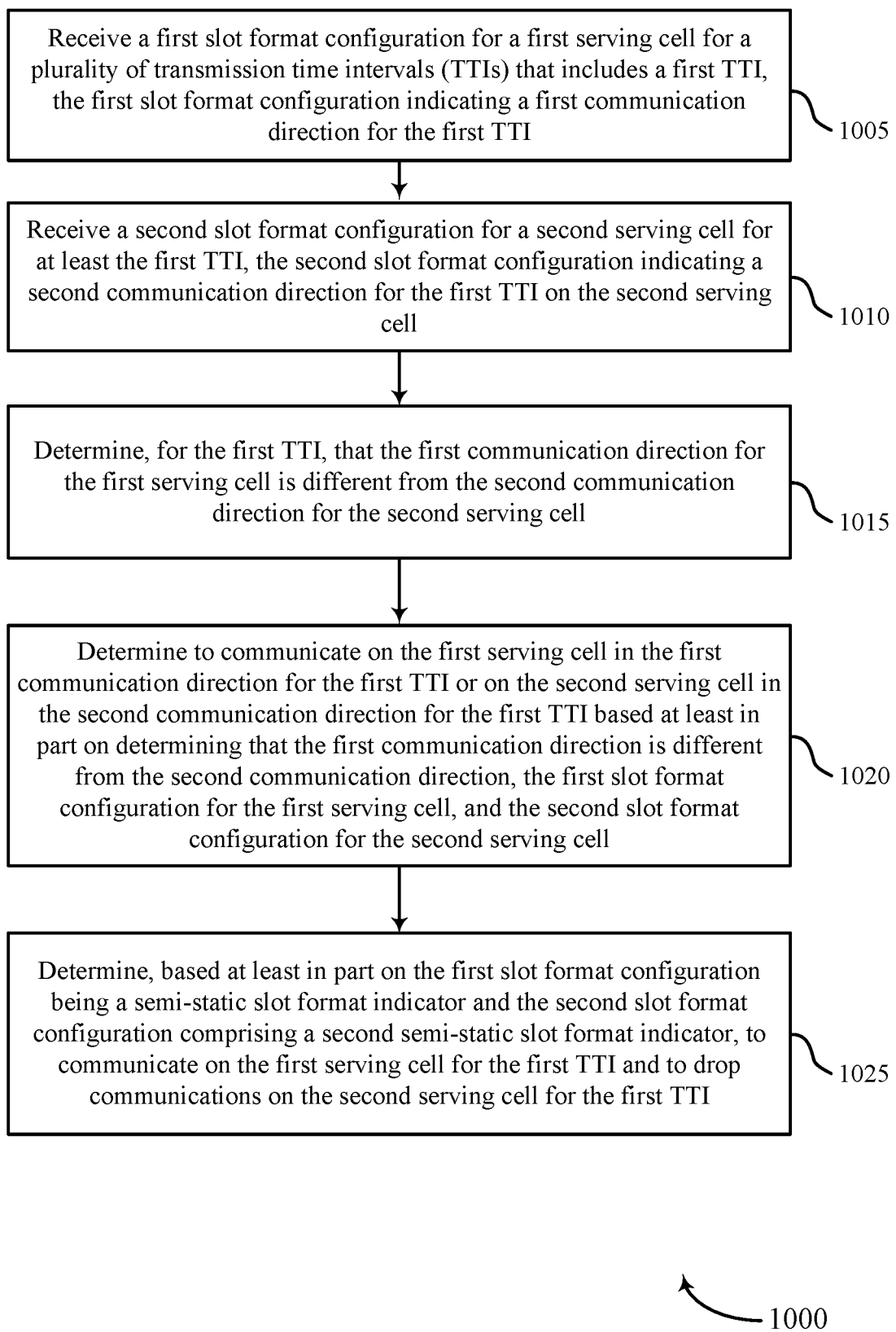

FIG. 10 shows a flowchart illustrating a method 1000 that supports half duplex handling in carrier aggregation in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1005, the UE may receive a first slot format configuration for a first serving cell for a plurality of TTIs that includes a first TTI, the first slot format configuration indicating a first one or more communication directions for the first TTI. In some cases, the UE may receive a first slot format configuration for a first serving cell for a set of TTIs that include a first TTI. The operations of 1005 may be performed according to the methods described herein. In some examples, aspects of the operations of 1005 may be performed by a slot format configuration receiving component as described with reference to FIGS. 4 through 7.

At 1010, the UE may receive a second slot format configuration for a second serving cell for at least the first TTI, the second slot format configuration indicating a second one or more communication directions for the first TTI on the second serving cell. In some cases, the UE may receive, following the first slot format configuration, a second slot format configuration for the first serving cell for at least the first TTI, the second slot format configuration for the first TTI conflicting with the first slot format configuration for the first TTI. The operations of 1010 may be performed according to the methods described herein. In some examples, aspects of the operations of 1010 may be performed by a slot format configuration receiving component as described with reference to FIGS. 4 through 7.

At 1015, the UE may determine, for the first TTI, that the first one or more communication directions for the first serving cell conflicts with the second one or more communication directions for the second serving cell. In some cases, the UE may determine, based on the second slot format configuration having a higher priority than the first slot format configuration, a first one or more communication directions for the first serving cell for the first TTI. The operations of 1015 may be performed according to the methods described herein. In some examples, aspects of the operations of 1015 may be performed by a communication direction determining component as described with reference to FIGS. 4 through 7.

At 1020, the UE may determine to communicate on the first serving cell in the first one or more communication directions for the first TTI or on the second serving cell in the second one or more communication directions for the first TTI based at least in part on determining that the first one or more communication directions conflicts with the second one or more communication directions, the first slot format configuration for the first serving cell, and the second slot format configuration for the second serving cell. In some cases, the UE may determine that the first TTI is downlink based on the received first slot format configuration and the received second slot format configuration, where the received first slot format configuration for the first serving cell includes RRC signaling, and the second slot format configuration for the first serving cell includes DCI or a dynamic SFI identifying the first TTI as downlink, the method further including. The operations of 1020 may be performed according to the methods described herein. In some examples, aspects of the operations of 1020 may be performed by a communication direction determining component as described with reference to FIGS. 4 through 7.

At 1025, the UE may determine to compare the first one or more communication directions for the first serving cell to the second one or more communication directions for the second serving based at least in part on the first slot format configuration having a higher priority than the first slot format configuration. The operations of 1025 may be performed according to the methods described herein. In some examples, aspects of the operations of 1025 may be performed by a communication direction identifying component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a first slot format configuration for a first serving cell for at least a transmission time interval (TTI), the first slot format configuration indicating a first plurality of communication directions for the TTI, the first plurality of communication directions including at least a first communication direction for a first transmission on the first serving cell;
   receiving a second slot format configuration for a second serving cell for at least the TTI, the second slot format configuration indicating a second plurality of communication directions for the TTI on the second serving cell, the second plurality of communication directions including at least a second communication direction for a second transmission on the second serving cell, wherein the second communication direction is different from the first communication direction, and wherein the second transmission is scheduled to at least partially overlap in time with the first transmission; and
   communicating the first transmission on the first serving cell in the first communication direction and dropping the second transmission on the second serving cell in the second communication direction TTI based at least in part on the first communication direction being different from the second communication direction.

2. The method of claim 1, further comprising:
   receiving, following the first slot format configuration, a third slot format configuration for the first serving cell for at least the TTI, the third slot format configuration for the TTI indicating a third communication direction for a third transmission that is different from each of the first plurality of communication directions for the TTI; and
   comparing the first plurality of communication directions for the first serving cell to the second plurality of communication directions for the second serving cell based at least in part on the second slot format configuration having a higher priority than the first slot format configuration.

3. The method of claim 1, wherein:
   dropping the second transmission on the second serving cell is further based at least in part on the first serving cell being in a different radio frequency spectrum band than the second serving cell.

4. The method of claim 1, wherein:
   dropping the second transmission on the second serving cell is further based at least in part on the first slot format configuration being indicated by a semi-static slot format indicator of a first radio resource control signal and the second slot format configuration being indicated by a second radio resource control signal.

5. The method of claim 1, wherein:
   dropping the second transmission on the second serving cell is further based at least in part on the first slot format configuration being a semi-static slot format indication, the second slot format configuration comprising a dynamic slot format indication, the first plurality of communication directions being downlink, and the second plurality of communication directions being uplink.

6. The method of claim 5, wherein:
   dropping the second transmission on the second serving cell is further based at least in part on the first serving cell being in a different radio frequency spectrum band than the second serving cell.

7. The method of claim 1, wherein:
   dropping the second transmission on the second serving cell is further based at least in part on the first slot format configuration being received in first radio resource control signaling and the second slot format configuration being received in second radio resource control signaling.

8. The method of claim 1, wherein:
   dropping the second transmission on the second serving cell is further based at least in part on the first slot format configuration being received in radio resource control signaling and the second slot format configuration comprising a semi-static slot format indicator.

9. The method of claim 1, wherein:
   dropping the second transmission on the second serving cell is further based at least in part on the first slot format configuration being received in radio resource control signaling and the second slot format configuration comprising a dynamic slot format indicator.

10. The method of claim 9, wherein:
    dropping the second transmission on the second serving cell is further based at least in part on the first serving cell being in a different radio frequency spectrum band than the second serving cell.

11. The method of claim 1, wherein the first serving cell and the second serving cell are within a same radio frequency spectrum band.

12. The method of claim 1, wherein the first serving cell is within a first radio frequency spectrum band and the second serving cell is within a second radio frequency spectrum band.

13. The method of claim 1, wherein the second serving cell comprises one of a plurality of serving cells.

14. The method of claim 1, wherein the first serving cell comprises a reference serving cell, and the second serving cell comprises an other serving cell.

15. The method of claim 14, wherein the reference serving cell comprises a primary cell of a carrier aggregation configuration, and the other serving cell comprises a secondary cell of the carrier aggregation configuration.

16. The method of claim 14, wherein the reference serving cell comprises a first secondary cell of a carrier aggregation configuration, and the other serving cell comprises a second secondary cell of the carrier aggregation configuration.

17. The method of claim 1, wherein the TTI comprises a slot or a plurality of symbols.

18. An apparatus for wireless communication at a user equipment (UE), comprising:
- a processor; and
- memory coupled with the processor, wherein the memory comprises instructions executable by the processor to cause the apparatus to:
  - receive a first slot format configuration for a first serving cell for at least a transmission time interval (TTI), the first slot format configuration indicating a first plurality of communication directions for the TTI, the first plurality of communication directions including at least a first communication direction for a first transmission on the first serving cell;
  - receive a second slot format configuration for a second serving cell for at least the TTI, the second slot format configuration indicating a second plurality of communication directions for the TTI on the second serving cell, the second plurality of communication directions including at least a second communication direction for a second transmission on the second serving cell, wherein the second communication direction is different from the first communication direction, and wherein the second transmission is scheduled to at least partially overlap in time with the first transmission; and
  - communicate the first transmission on the first serving cell in the first communication direction and drop the second transmission on the second serving cell in the second communication direction based at least in part on the first communication direction being different from the second communication direction.

19. The apparatus of claim 18, wherein the instructions are further executable by the processor to cause the apparatus to:
- receive, following the first slot format configuration, a third slot format configuration for the first serving cell for at least the TTI, the third slot format configuration for the TTI indicating a third communication direction for a third transmission that is different from each of the first plurality of communication directions for the TTI; and
- compare the first plurality of communication directions for the first serving cell to the second plurality of communication directions for the second serving cell based at least in part on the second slot format configuration having a higher priority than the first slot format configuration.

20. The apparatus of claim 18, wherein dropping the second transmission on the second serving cell is further based at least in part on the first serving cell being in a different radio frequency spectrum band than the second serving cell.

21. The apparatus of claim 18, wherein dropping the second transmission on the second serving cell is further based at least in part on the first slot format configuration indicated by a semi-static slot format indicator of a first radio resource control signal and the second slot format configuration indicated by a second radio resource control signal.

22. The apparatus of claim 18, wherein dropping the second transmission on the second serving cell is further based at least in part on the first slot format configuration being a semi-static slot format indication, the second slot format configuration comprising a dynamic slot format indication, the first plurality of communication directions being downlink, and the second plurality of communication directions being uplink.

23. The apparatus of claim 22, wherein dropping the second transmission on the second serving cell is further based at least in part on the first serving cell being in a different radio frequency spectrum band than the second serving cell.

24. The apparatus of claim 18, wherein dropping the second transmission on the second serving cell is further:
- based at least in part on the first slot format configuration being received in first radio resource control signaling and the second slot format configuration being received in second radio resource control signaling.

25. The apparatus of claim 18, wherein dropping the second transmission on the second serving cell is further based at least in part on the first slot format configuration being received in radio resource control signaling and the second slot format configuration comprising a semi-static slot format indicator.

26. The apparatus of claim 18, wherein dropping the second transmission on the second serving cell is further based at least in part on the first slot format configuration being received in radio resource control signaling and the second slot format configuration comprising a dynamic slot format indicator.

27. The apparatus of claim 26, wherein dropping the second transmission on the second serving cell is further based at least in part on the first serving cell being in a different radio frequency spectrum band than the second serving cell.

28. An apparatus for wireless communication at a user equipment (UE), comprising:
- means for receiving a first slot format configuration for a first serving cell for at least a transmission time interval (TTI), the first slot format configuration indicating a first plurality of communication directions for the TTI, the first plurality of communication directions including at least a first communication direction for a first transmission on the first serving cell;
- means for receiving a second slot format configuration for a second serving cell for at least the TTI, the second slot format configuration indicating a second plurality of communication directions for the TTI on the second serving cell, the second plurality of communication directions including at least a second communication direction for a second transmission on the second serving cell, wherein the second communication direction is different from the first communication direction, and wherein the second transmission is scheduled to at least partially overlap in time with the first transmission; and
- means for communicating the first transmission on the first serving cell in the first communication direction and dropping the second transmission on the second serving cell in the second communication direction based at least in part on the first communication direction being different from the second communication direction.

29. A non-transitory computer-readable medium storing code for wireless communication at a user equipment (UE), the code comprising instructions executable by a processor to:
- receive a first slot format configuration for a first serving cell for at least a transmission time interval (TTI), the first slot format configuration indicating a first plurality of communication directions for the TTI, the first plurality of communication directions including at least a first communication direction for a first transmission on the first serving cell;

receive a second slot format configuration for a second serving cell for at least the TTI, the second slot format configuration indicating a second plurality of communication directions for the TTI on the second serving cell, the second plurality of communication directions including at least a second communication direction for a second transmission on the second serving cell, wherein the second communication direction is different from the first communication direction, and wherein the second transmission is scheduled to at least partially overlap in time with the first transmission; and communicate the first transmission on the first serving cell in the first communication direction and drop the second transmission on the second serving cell in the second communication direction based at least in part on the first communication direction being different from the second communication direction.

* * * * *